US012403861B2

United States Patent
Aiuchi et al.

(10) Patent No.: US 12,403,861 B2
(45) Date of Patent: Sep. 2, 2025

(54) VEHICLE EXTERNAL AIRBAG DEVICE FOR VEHICLE

(71) Applicant: SUBARU CORPORATION, Tokyo (JP)

(72) Inventors: Hayato Aiuchi, Tokyo (JP); Yuka Abe, Tokyo (JP); Daisuke Ototsuji, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 18/608,076

(22) Filed: Mar. 18, 2024

(65) Prior Publication Data
US 2024/0351551 A1    Oct. 24, 2024

(30) Foreign Application Priority Data
Apr. 24, 2023  (JP) ................. 2023-070659

(51) Int. Cl.
*B60R 21/36* (2011.01)

(52) U.S. Cl.
CPC .................... *B60R 21/36* (2013.01)

(58) Field of Classification Search
CPC ....................................................... B60R 21/36
See application file for complete search history.

(56) References Cited

U.S. PATENT DOCUMENTS

| | | | | |
|---|---|---|---|---|
| 2003/0178239 | A1* | 9/2003 | Takimoto | B60R 21/36 180/274 |
| 2007/0114090 | A1* | 5/2007 | Okamoto | B60R 21/36 180/274 |
| 2016/0023629 | A1* | 1/2016 | Park | B60R 21/36 180/274 |
| 2016/0264093 | A1* | 9/2016 | Suemune | B60R 21/36 |
| 2019/0071050 | A1* | 3/2019 | Farooq | B60R 21/36 |
| 2019/0084521 | A1* | 3/2019 | Farooq | B60R 21/38 |
| 2019/0375368 | A1* | 12/2019 | Kanno | B60R 21/233 |

FOREIGN PATENT DOCUMENTS

| | | | | |
|---|---|---|---|---|
| CN | 116133907 | A * | 5/2023 | B60R 21/36 |
| CN | 116691590 | A * | 9/2023 | B60R 21/00 |
| EP | 2599670 | A1 * | 6/2013 | B60R 21/233 |
| EP | 2765036 | A1 * | 8/2014 | B60R 21/233 |
| EP | 2796327 | A2 * | 10/2014 | B60R 21/237 |
| EP | 4234342 | A1 * | 8/2023 | B60R 21/233 |

(Continued)

*Primary Examiner* — Nicole T Verley
(74) *Attorney, Agent, or Firm* — MCGINN I.P. LAW GROUP, PLLC

(57) ABSTRACT

A vehicle external airbag device for a vehicle includes a vehicle external airbag which is deployable rearward of the vehicle from between a nose in the vehicle and a front glass of a cabin of the vehicle and over the front glass with a high-pressure gas of an inflator. The vehicle external airbag includes: a central bag deploying in a vehicle width direction; a right bag joined to a right side of the central bag and deploying to extend rearward of the central bag to overlap a front pillar on a right side of the front glass; and a left bag joined to a left side of the central bag and deploying to extend rearward of the central bag to overlap a front pillar on a left side of the front glass. The high-pressure gas is preferentially supplied to the central bag rather than the right and left bags.

7 Claims, 10 Drawing Sheets

(56) References Cited

FOREIGN PATENT DOCUMENTS

| | | | | |
|---|---|---|---|---|
| JP | 2003252138 A | * | 9/2003 | |
| JP | 2003291756 A | * | 10/2003 | ............. B60R 21/36 |
| JP | 2003312405 A | * | 11/2003 | |
| JP | 2004-299516 A | | 10/2004 | |
| JP | 2006-069349 A | | 3/2006 | |
| JP | 2006159970 A | * | 6/2006 | |
| JP | 2006205934 A | * | 8/2006 | ............. B60R 21/36 |
| JP | 2006298154 A | * | 11/2006 | |
| JP | 2007153062 A | * | 6/2007 | |
| JP | 3941584 B2 | * | 7/2007 | |
| JP | 2008222148 A | * | 9/2008 | |
| JP | 2008273250 A | * | 11/2008 | |
| JP | 2008284935 A | * | 11/2008 | ........... B60R 21/231 |
| JP | 4278339 B2 | * | 6/2009 | ............. B60R 21/36 |
| JP | 2010235007 A | * | 10/2010 | |
| JP | 4621119 B2 | * | 1/2011 | ............. B60R 21/36 |
| JP | 2015508732 A | * | 3/2015 | |
| JP | 2015214310 A | * | 12/2015 | |
| JP | 2016-506894 A | | 3/2016 | |
| JP | 2016097833 A | * | 5/2016 | |
| JP | 6277946 B2 | * | 2/2018 | |
| KR | 20130009326 A | * | 1/2013 | |
| KR | 20190059844 A | * | 5/2019 | |
| WO | WO-2007083537 A1 | * | 7/2007 | ......... B60R 21/2338 |
| WO | WO-2007099912 A1 | * | 9/2007 | ......... B60R 21/2338 |
| WO | WO-2008117496 A1 | * | 10/2008 | ............. B60R 21/36 |
| WO | WO 2014/129942 A1 | | 8/2014 | |

\* cited by examiner

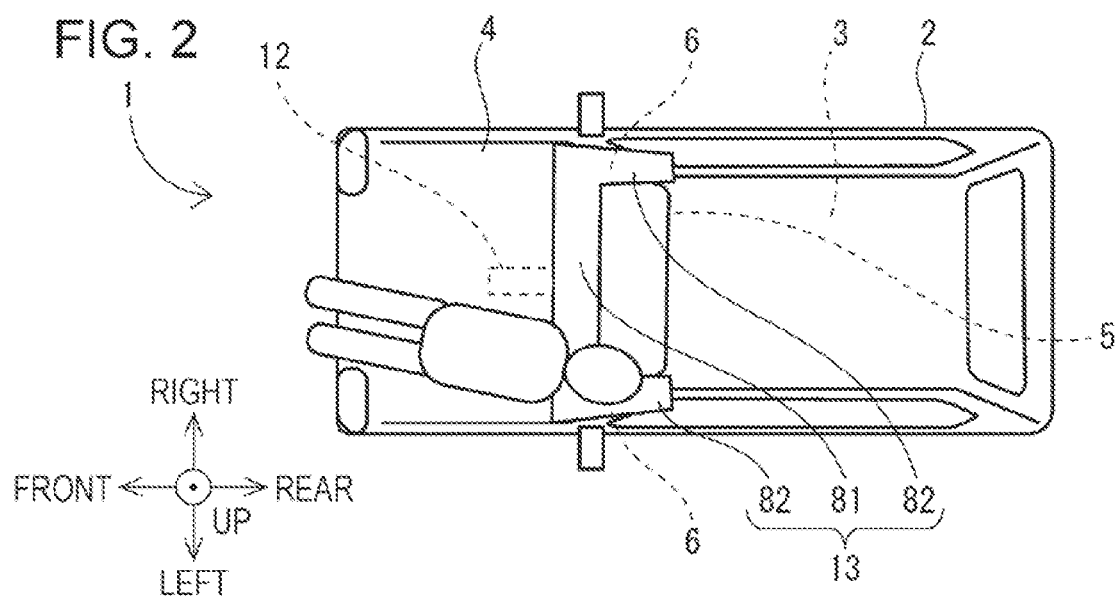
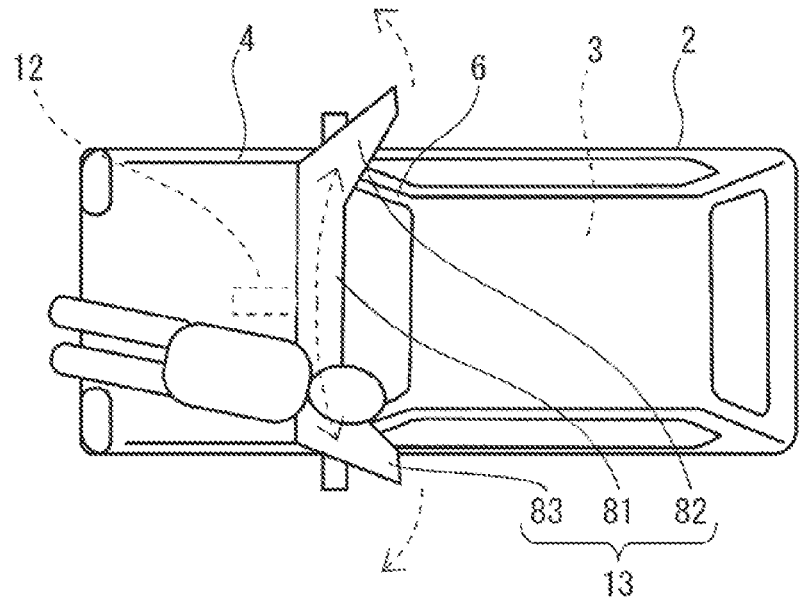
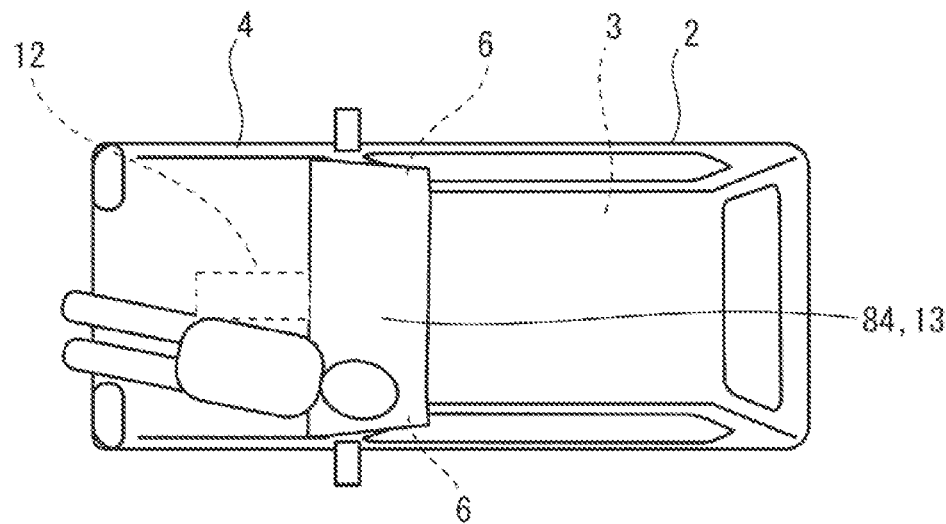

VEHICLE EXTERNAL AIRBAG DEVICE FOR VEHICLE

CROSS-REFERENCE TO RELATED APPLICATIONS

The present application claims priority from Japanese Patent Application No. 2023-070659 filed on Apr. 24, 2023, the entire contents of which are hereby incorporated by reference.

BACKGROUND

The disclosure relates to a vehicle external airbag device for a vehicle.

A vehicle such as an automobile drives on a road where, for example, pedestrians and/or cyclists pass.

In this situation, a vehicle may hit, for example, a pedestrian or a cyclist.

Japanese Unexamined Patent Application Publication (JP-A) Nos. 2004-299516, 2006-069349, and 2016-506894 disclose a vehicle external airbag that deploys to extend from the rear end of the nose in front of the cabin of a vehicle to the front glass of the cabin.

Due to deployment of the vehicle external airbag, the head of a pedestrian or a cyclist who is thrown over a vehicle is directly hit by the airbag which has deployed, but is unlikely to be directly hit by the vehicle.

SUMMARY

An aspect of the disclosure provides a vehicle external airbag device for a vehicle. The vehicle includes a cabin. The vehicle external airbag device includes a vehicle external airbag configured to, with supply of a high-pressure gas of an inflator, deploy, in the vehicle, rearward of the vehicle from between a nose in front of the cabin and a front glass of the cabin so as to deploy over the front glass. The vehicle external airbag includes a central bag, a right bag, a left bag. The central bag is configured to deploy in a center of the vehicle in a vehicle width direction of the vehicle. The right bag is joined to a right side of the central bag in the vehicle width direction, and configured to deploy to extend rearward of the central bag in the vehicle so as to overlap a front pillar on a right side of the front glass in the vehicle width direction. The left bag is joined to a left side of the central bag in the vehicle width direction, and configured to deploy to extend rearward of the central bag in the vehicle so as to overlap a front pillar on a left side of the front glass in the vehicle width direction. The high-pressure gas supplied by the inflator to the vehicle external airbag is preferentially supplied to the central bag rather than the right bag and the left bag at least at a time when vehicle external airbag starts to deploy.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 2 is an explanatory view of a situation where a pedestrian is thrown over the vehicle in FIG. 1;

FIG. 3 is an explanatory view of an example of another deployment state of a vehicle external airbag in related art, in which a central member and bendable members on both right and left sides in the vehicle width direction form one air chamber;

FIG. 4 is an explanatory view of an example of a deployment state of a vehicle external airbag formed by a large bag that covers the front glass;

FIG. 6 is an example of a flowchart of vehicle external protection control performed by a controller in FIG. 5 to protect pedestrians and the like;

DETAILED DESCRIPTION

Figure 1:
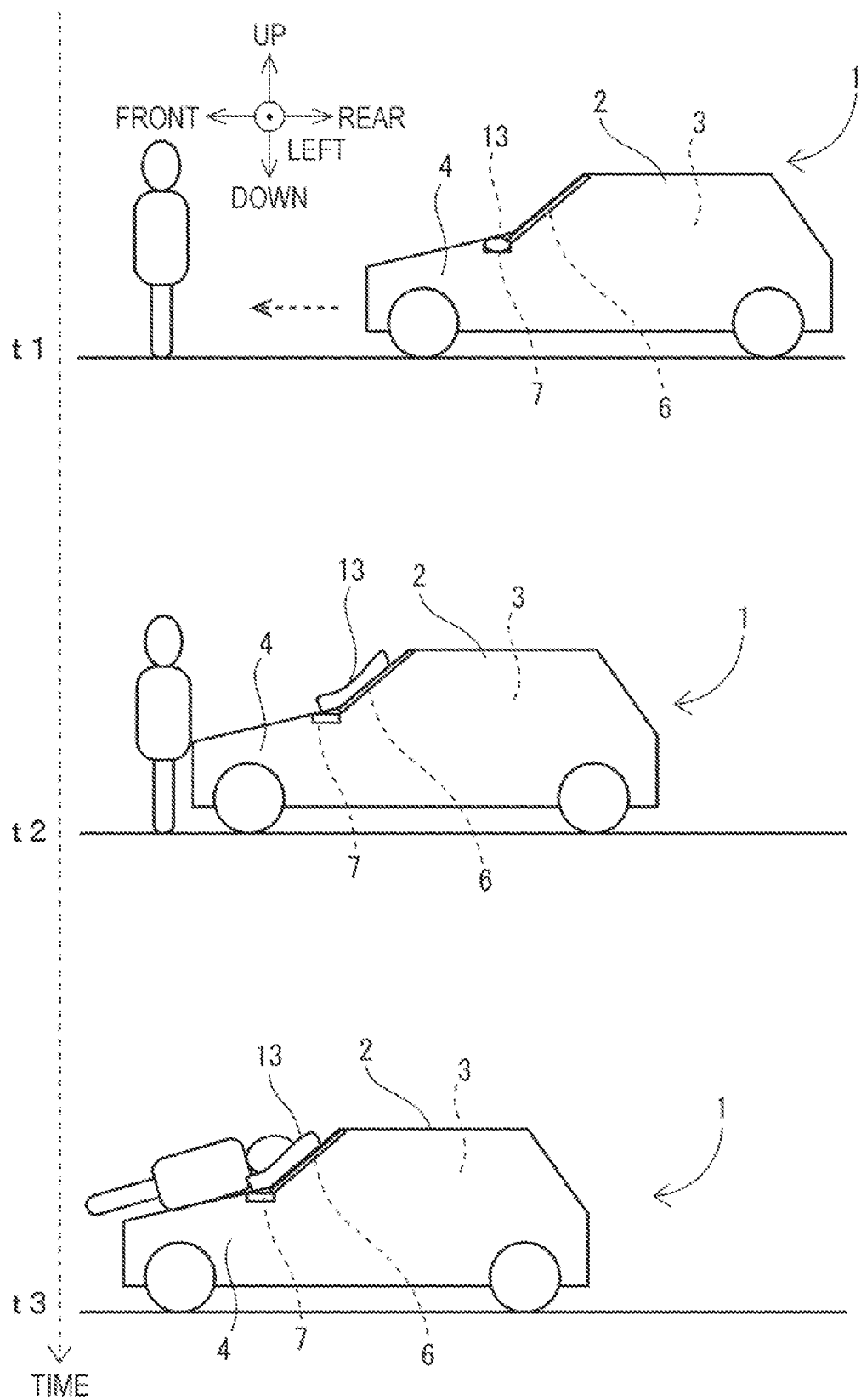
FIG. 1 is an explanatory view of an example when a vehicle, to which an embodiment of the disclosure is applicable, collides with a pedestrian.

In the vehicle external airbag in JP-A Nos. 2004-299516, 2006-069349 and 2016-506894, a bag is designed to deploy from between the nose and the front glass of a vehicle in such a manner that both right and left ends of the bag in the vehicle width direction are bent rearward of the vehicle. In this situation, the right and left bendable members bent rearward of the vehicle on the right and left of the vehicle external airbag form one air chamber with the central member of the vehicle external airbag. Thus, the right and left bendable members along with the central member of the vehicle external airbag deploy as one unit. The right and left bendable members of the vehicle external airbag are likely to fluctuate in the right-left direction by a high-pressure gas injected from the central member of the vehicle external airbag during deployment. As a result, the right and left bendable members do not deploy along the front pillars of the vehicle, but are likely to deploy to deviate to the outside of the front pillars.

It is desirable that the central member of the vehicle external airbag deploy with large capacity and thickness to protect the head of a pedestrian who is thrown over the nose of a vehicle. In contrast, it is sufficient that the right and left bendable members basically cover the front pillars of the vehicle, and for that purpose, the right and left bendable members are allowed to be formed into a thin shape with a capacity smaller than that of the central member. However, when the right and left bendable members are made thinner than the central member with a large capacity resulting in a small capacity in this manner, the right and left bendable members are likely to deviate to the outside of the front pillars due to the high-pressure gas which expands in the right-left direction at the central member.

In order to prevent deviation of the right and left bendable members to the outside of the front pillars, the right and left bendable members may also be thickened to have a capacity comparable to that of the central member to make it difficult to move the right and left bendable members outward by the high-pressure gas which expands in the right-left direction from the central member. In this situation, in the vehicle external airbag, not only the central member, but also the right and left bendable members have a large capacity. The amount of high-pressure gas used to deploy the vehicle external airbag, and the time from the start of deployment of the vehicle external airbag to completion of the deployment increases. Moreover, even when the right and left bendable members are provided with a large capacity, the right and left bendable members still deploy by the high-pressure gas which expands from the central member in the right-left direction. As a result, even when the right and left bendable members are provided with a large capacity, deviation of the right and left bendable members to the outside of the front pillars is not necessarily prevented.

Thus, it is desired to improve the vehicle external airbag device provided in a vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

FIG. 1 is an explanatory view of an example when a vehicle 1 such as an automobile, to which a vehicle external airbag device according to an embodiment of the disclosure is applicable, collides with a pedestrian. FIG. 1 illustrates the vehicle 1 as, and a pedestrian. In FIG. 1, time flows from above to below.

At time t1, the vehicle 1 runs forward. A pedestrian is on the path of the vehicle 1. If the vehicle 1 continues running, the vehicle 1 hits the pedestrian at subsequent time t2.

At time t3, the pedestrian is thrown over the vehicle 1.

Note that in the present embodiment, the up, down, right, left, front, and rear are used based on the correspondence relationship illustrated in FIG. 1. The vehicle width direction of the vehicle 1 is the right-left direction.

FIG. 2 is an explanatory view of a situation where a pedestrian is thrown over the vehicle 1 in FIG. 1. FIG. 2 corresponds to the state at time t3 in FIG. 1. FIG. 2 is a top view of the vehicle 1 when a pedestrian is thrown over the vehicle 1.

In the vehicle 1, a vehicle external airbag 13 deploys based on e.g., prediction of collision with the pedestrian at time t1 in FIG. 1 and detection of collision with the pedestrian at time t2 in FIG. 1.

The vehicle external airbag 13 deploys to extend from the rear end of a nose 4 in front of a cabin 3 of the vehicle 1 to a front glass 5 of the cabin 3.

The vehicle external airbag 13 in FIG. 2 includes, between the nose 4 and the front glass 5, a central member 81 extending in a vehicle width direction of the vehicle 1, and a pair of right and left bendable members 82 provided to project rearward of the vehicle 1 from both right and left ends of the central member 81 in the vehicle width direction. The central member 81 and the pair of right and left bendable members 82 internally communicate with each other, and form one air chamber. The pair of right and left bendable members 82 overlap the front pillars 6 provided on both right and left sides of the front glass 5 in the vehicle width direction. The right and left front pillars 6 are covered in its entirety by the pair of right and left bendable members 82.

In this manner, the vehicle 1 causes the vehicle external airbag 13 to deploy, for example, at the timing of time t2 in FIG. 1. Thus, even if the pedestrian is thrown over the vehicle 1 at subsequent time t3, the pedestrian is hit by the deployed vehicle external airbag 13, and the pedestrian is unlikely to be directly hit by a vehicle body 2 such as the front pillars 6 of the vehicle 1. The pedestrian thrown over the vehicle 1 can be protected by the deployed vehicle external airbag 13.

In addition to a pedestrian, e.g., a cyclist who rides on a bicycle may be thrown over the vehicle 1. For example, the waist height of a cyclist at the time of collision may be higher than that of a pedestrian, and in such a situation, the cyclist is likely to be thrown over the vehicle 1, and hit by a front pillar 6 of the vehicle 1. For a pedestrian and a cyclist, the state of being thrown over the vehicle 1 varies with the velocity of the vehicle 1.

FIG. 3 is an explanatory view of an example of another deployment state of the vehicle external airbag 13 in related art, in which the central member 81 and the bendable members 82 on both right and left sides in the vehicle width direction form one air chamber.

The vehicle external airbag 13 in related art not necessarily deploys favorably as in FIG. 2.

For example, when an inflator 12 supplies a high-pressure gas to the central member 81 of the vehicle external airbag 13, the high-pressure gas supplied to the central member 81 flows through the central member 81 in the vehicle width direction to expand the central member 81 in the vehicle width direction.

It is desirable that the central member 81 of the vehicle external airbag 13 deploy with large capacity and thickness to protect the head of a pedestrian who is thrown over the nose 4 of the vehicle 1. In contrast, it is sufficient that the pair of right and left bendable members 82 basically cover the front pillars 6 of the vehicle 1, and for that purpose, the right and left bendable members 82 are allowed to be formed into a thin shape with a capacity smaller than that of the central member 81.

As a result, even when the pair of right and left bendable members 82, which is provided on both right and left ends of the central member 81 in the vehicle width direction to form one air chamber along with the central member 81, is linked to the central member 81 to deploy in the front-rear direction of the vehicle 1, the right and left bendable members 82 are likely to deploy to expand in the vehicle width direction of the vehicle 1. As illustrated in FIG. 3, the pair of right and left bendable members 82 may deploy to expand in the vehicle width direction of the vehicle 1, and may deploy not over the right and left front pillars 6, but may deploy to deviate to the outside of the right and left front pillars 6.

In this situation, the pedestrian thrown over the vehicle 1 is not protected by the deployed vehicle external airbag 13, and directly hit by the vehicle body 2 such as a front pillar 6 of the vehicle 1.

FIG. 4 is an explanatory view of an example of a deployment state of a vehicle external airbag formed by a large bag 84 that covers the front glass 5.

In FIG. 4, the vehicle external airbag 13, unlike the one in FIG. 3, deploys to a substantially quadrilateral external shape in a large size to cover the front glass 5 in its entirety.

When the vehicle external airbag 13 has a large size to cover the front glass 5 in its entirety like this, the vehicle external airbag 13 is likely to overlap the right and left front pillars 6.

However, when the vehicle external airbag 13 has a large size to cover the front glass 5 in its entirety, the amount of high-pressure gas to deploy the vehicle external airbag 13 increases. It takes time for the vehicle external airbag 13 to complete its deployment since the start of deployment. The vehicle external airbag 13 may start deployment at a stage earlier than time t1 in FIG. 1. If the timing to determine collision with a pedestrian or the like is advanced, reliable right decision is difficult to be achieved accordingly.

For example, even in the vehicle external airbag 13 described above in FIG. 3, the pair of right and left bendable members 82 may be thickened to have a capacity comparable to that of the central member 81 to make it difficult to move the pair of right and left bendable members 82 outward by the high-pressure gas which expands from the central member 81 in the right-left direction. In this situation, in the vehicle external airbag 13, not only the central member 81, but also the pair of right and left bendable members 82 have a large capacity. The amount of high-pressure gas to deploy the vehicle external airbag 13, and the deployment time of the vehicle external airbag 13 increase. Moreover, even when the pair of right and left bendable members 82 has a large capacity, the pair of right and left bendable members 82 still deploys by the high-pressure gas which expands from the central member 81 in the right-left direction. It would be difficult to claim that the pair of right and left bendable members 82 having a large capacity is unlikely to deviate to the outside of the front pillars 6.

Thus, it is desired to improve the vehicle external airbag device provided in the vehicle 1.

Next, a vehicle external airbag device according to a first embodiment of the disclosure will be described.

Figure 5:
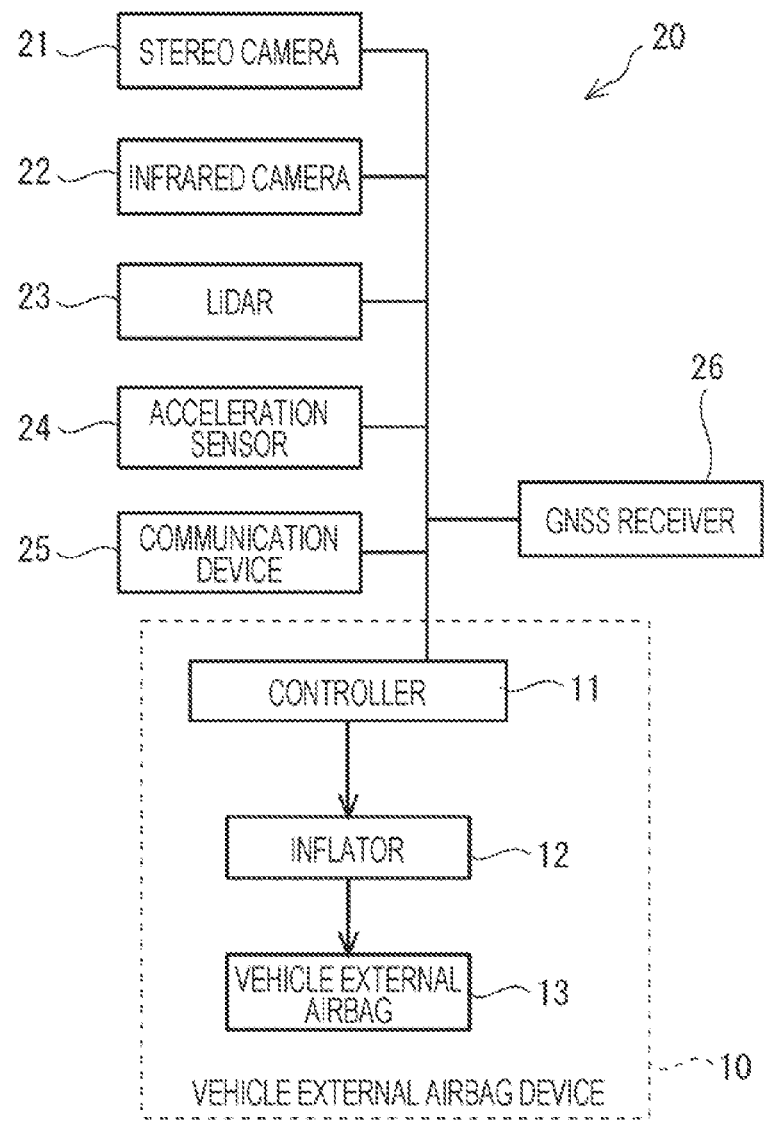
FIG. 5 is an explanatory diagram of a control system for a vehicle, including a vehicle external airbag device according to a first embodiment of the disclosure.

FIG. 5 is an explanatory diagram of a control system 20 for the vehicle 1, including a vehicle external airbag device 10 according to a first embodiment of the disclosure.

The control system 20 for the vehicle 1 in FIG. 5 includes the vehicle external airbag device 10, and a stereo camera 21, an infrared camera 22, a Lidar 23, an acceleration sensor 24, a communication device 25, and a global navigation satellite system (GNSS) receiver 26, which are coupled to the vehicle external airbag device 10.

The stereo camera 21 is disposed, for example, at the front of the cabin 3 in a forward direction. The stereo camera 21 includes image pickup devices arranged in the vehicle width direction. The stereo camera 21 may pick up a parallax image obtained by images of a forward area picked up by the image pickup devices, the forward area being in the traveling direction of the vehicle 1.

When there is a pedestrian in the forward area of the vehicle 1 as in FIG. 1, the stereo camera 21 picks up a vehicle external image including an image of the pedestrian. The stereo camera 21 may extract a pedestrian or a cyclist included in the picked-up image by image analysis. The stereo camera 21 may calculate relative direction and distance from the vehicle to the pedestrian or the cyclist based on the position and range of the picked-up image for the image of the extracted pedestrian or cyclist. Note that when a parallax image is constituted by picked-up images, relative direction and distance can be calculated with high accuracy based on the difference in the imaging positions of the picked-up images.

The stereo camera 21 may calculate the presence or absence of movement, movement direction, and movement velocity of a pedestrian or a cyclist based on the position change in the image of the pedestrian or the cyclist which is picked up with shifted time.

The infrared camera 22 may be disposed, for example, at the front of the nose 4 of the vehicle 1 in a forward direction. In this situation, the infrared camera 22 can pick up an infrared image outside the vehicle, which has captured a pedestrian or a cyclist in front of the vehicle 1.

The Lidar 23 may be disposed, for example, at the front of the nose 4 of the vehicle 1 in a forward direction. In this situation, the Lidar 23 can generate information on space outside the vehicle, including a pedestrian or a cyclist in front of the vehicle 1. The Lidar 23 may scan the periphery of the vehicle 1 with a laser, and may generate space information on the space in the periphery of the vehicle 1 based on time of flight (TOF) of a reflected laser.

The acceleration sensor 24 detects an acceleration applied to the vehicle body 2 of the vehicle 1. The acceleration sensor 24 may be a three-axis sensor that can detect acceleration in three-axis directions: the front-rear direction, the right-left direction, and the up-down direction of the vehicle 1. When a pedestrian or a cyclist is hit by the vehicle 1, the acceleration sensor 24 can detect a high acceleration which is not observed during normal driving. Thus, the acceleration sensor 24 can detect a collision of the vehicle 1.

The communication device 25 communicates, by wireless communication, with an unillustrated base station installed along the road on which the vehicle 1 runs. The communication device 25 may communicate with another mobile object, e.g., a communication device 25 of another vehicle 1, a terminal carried by a pedestrian. The communication device 25 may receive information on another mobile object, such as the current position, movement direction, and movement velocity.

The GNSS receiver 26 receives radio waves from GNSS satellites. The GNSS receiver 26 may generate the current position, current time, and velocity of the vehicle 1 based on the position and time of each satellite, included in the radio waves received from the GNSS satellites.

The vehicle external airbag device 10 includes a controller 11, an inflator 12, and a vehicle external airbag 13.

The inflator 12 is ignited by an ignition signal of the controller 11 to produce a high-pressure gas.

Figure 9:
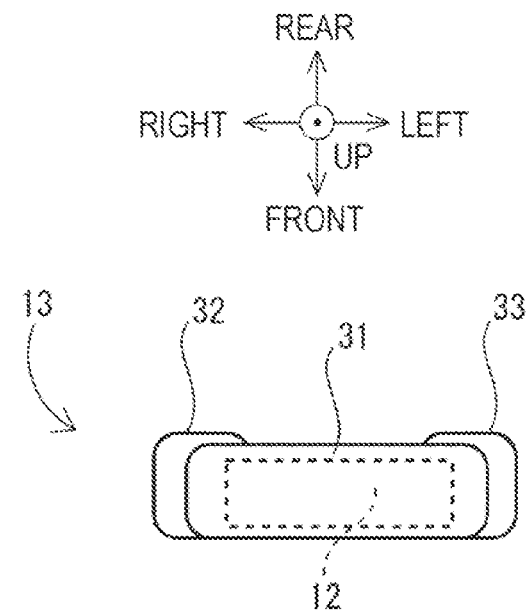
FIG. 9 is an explanatory view schematically illustrating a storage state of the vehicle external airbag in FIG. 7.

For the vehicle external airbag 13, a bag with a smooth surface made of e.g., nylon or other plastic fiber may be used. As illustrated in FIG. 9 described later, the vehicle external airbag 13 is folded compactly, and stored and disposed in the vehicle 1. The vehicle external airbag 13 is coupled to the inflator 12. When supplied with the high-pressure gas produced by the inflator 12, the vehicle external airbag 13 inflates and deploys. The vehicle external airbag 13 is deployable to a desired shape.

The controller 11 may include a central processing unit (CPU), a memory, and a timer. The timer measures an interval of time, and a time. The CPU reads a program recorded in the memory, and executes the program. Thus, the controller 11 is implemented in the control system 20 of the vehicle 1.

The controller 11 may obtain information from the stereo camera 21, the infrared camera 22, the Lidar 23, the acceleration sensor 24, and the communication device 25 to predict a collision with the vehicle 1, detect a collision with the vehicle 1, and control the operation of various protection devices such as the vehicle external airbag 13.

Figure 6:
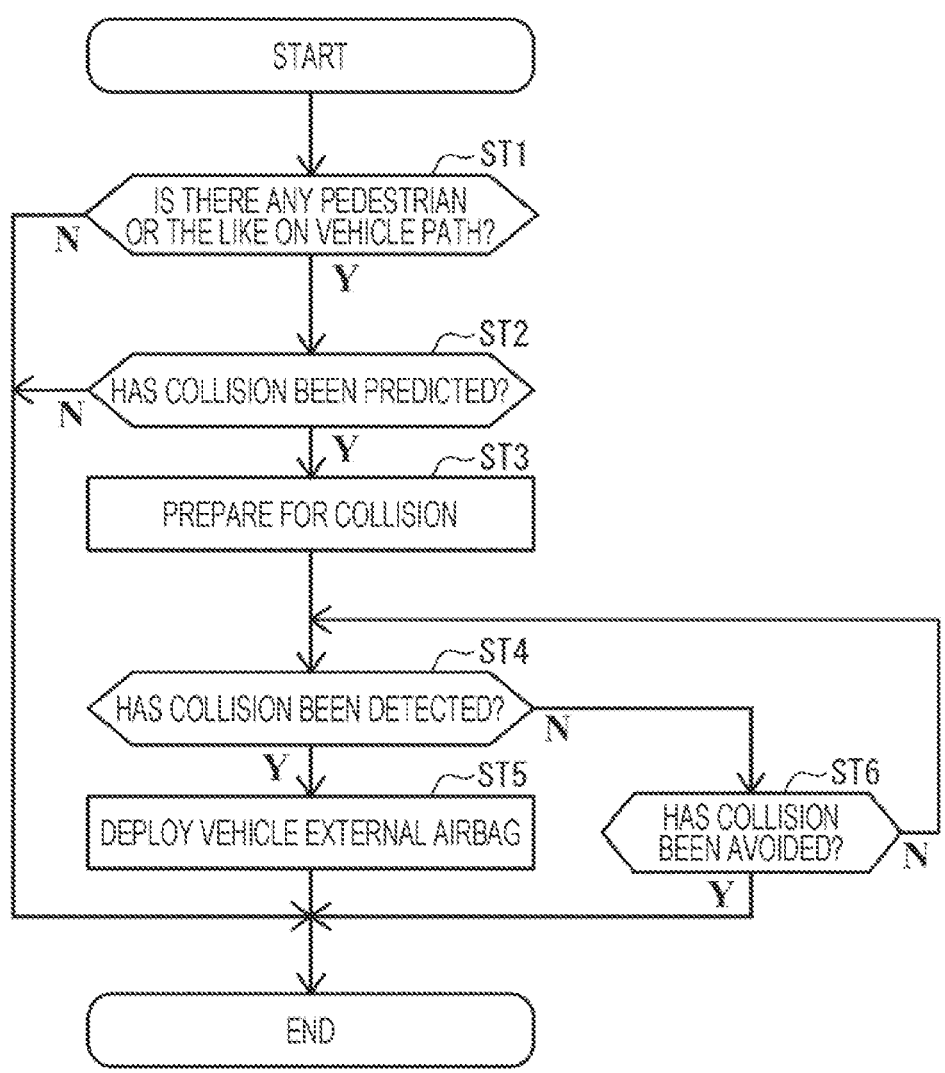

FIG. 6 is an example of a flowchart of vehicle external protection control performed by the controller 11 in FIG. 5 to protect pedestrians and the like.

For example, when the vehicle 1 is running, the controller 11 repeatedly performs the vehicle external protection control of FIG. 6. For example, when new information is obtained, the controller 11 may perform the vehicle external protection control of FIG. 6.

In step ST1, the controller 11 determines whether there is a pedestrian or the like on the path of a vehicle based on the newly obtained information on pedestrian. The controller 11 may determine whether there is a pedestrian or the like on the path of the vehicle based on, for example, whether the position of a detected pedestrian or the like is on the path of the vehicle, or whether the movement direction of a detected pedestrian or the like intersects with the path. When there is no pedestrian on the path of the vehicle, the controller 11 ends the control of FIG. 6. When there is a pedestrian on the path of the vehicle, the controller 11 causes the process to proceed to step ST2.

In step ST2, the controller 11 predicts a collision with a pedestrian or the like on the path of the vehicle. The controller 11 may predict a collision with a pedestrian or the like on the path of the vehicle based on, for example, whether the time difference between the timing when the vehicle reaches the position of a pedestrian or an intersection position and the timing when a pedestrian reaches the intersection position is less or equal to than a predetermined value. When a collision with a pedestrian or the like on the path of the vehicle is not predicted, the controller 11 ends the control of FIG. 6. When a collision with a pedestrian or the like on the path of the vehicle is predicted, the controller 11 causes the process to proceed to step ST3.

In step ST3, the controller 11 starts preparation for a collision with a pedestrian or the like. The controller 11 puts the vehicle external airbag device 10 in e.g., a startable state. Upon input of an ignition signal to the inflator 12, the controller 11 puts the vehicle external airbag device 10 in a state where the high-pressure gas is suppliable to the vehicle external airbag 13.

In step ST4, the controller 11 detects a collision with a pedestrian or the like. The controller 11 may detect a collision with a pedestrian or the like when the value of acceleration detected by the acceleration sensor 24 is higher than or equal to a threshold for collision. When a collision is not detected, the controller 11 causes the process to proceed to step ST6. When a collision is detected, the controller 11 causes the process to proceed to step ST5.

In step ST5, the controller 11 causes the vehicle external airbag 13 to deploy. The controller 11 outputs an ignition signal to the inflator 12 of the vehicle external airbag device 10. In the vehicle external airbag device 10, the inflator 12 supplies the high-pressure gas to the vehicle external airbag 13. The vehicle external airbag 13 deploys from between the nose 4 of the vehicle 1 and the front glass 5. Subsequently, the controller 11 ends the control.

In step ST6, the controller 11 determines whether a collision has been avoided. The controller 11 may determine that a collision has been avoided, for example, when the position of predicted collision with a pedestrian or the like deviates from the path, or when a predicted path of a pedestrian does not intersect with the path of the vehicle. In this situation, the controller 11 ends the control. When it is not determined that a collision has been avoided, the controller 11 returns the process to step ST4. Thus, the controller 11 repeats the process in step ST4 and step ST6 until it is determined that a collision is detected in step ST4 or a collision is avoided in step ST6.

Next, the vehicle external airbag 13 according to the first embodiment of the disclosure will be described in detail.

Figure 7:
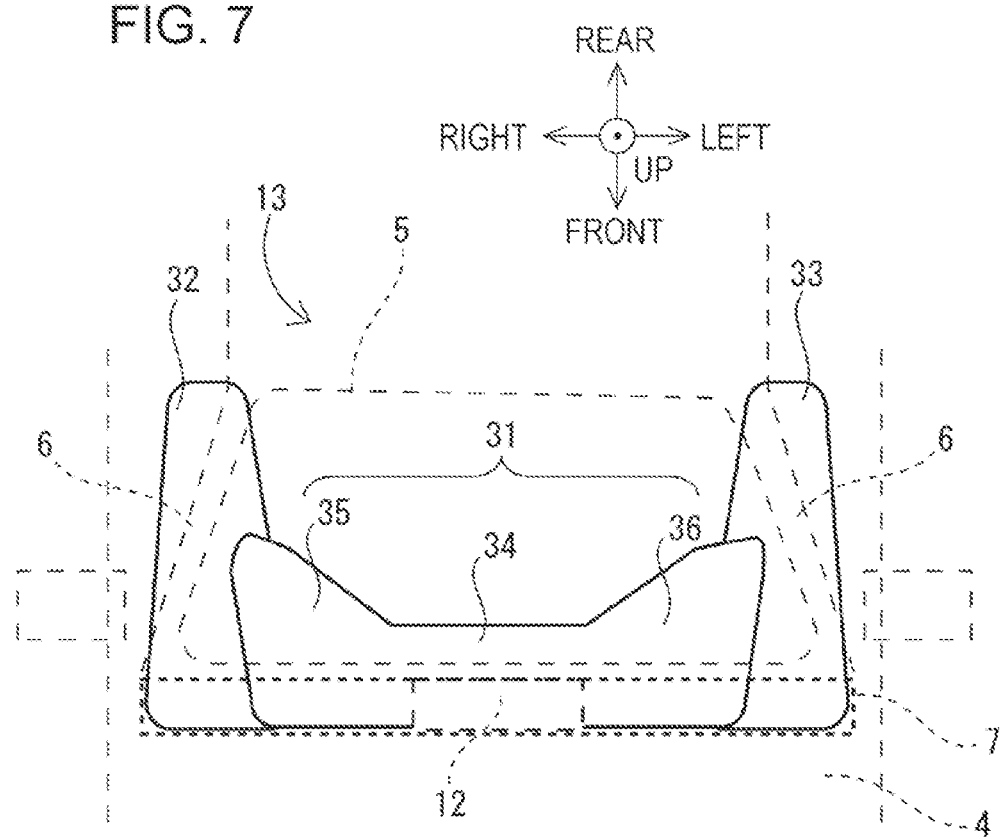
FIG. 7 is an explanatory view schematically illustrating the structure and installation in a vehicle of a vehicle external airbag according to the first embodiment of the disclosure with the vehicle external airbag deployed.

FIG. 7 is an explanatory view schematically illustrating the structure and installation in the vehicle 1 of the vehicle external airbag 13 according to the first embodiment of the disclosure with the vehicle external airbag deployed 13.

As the structure of the vehicle 1, FIG. 7 illustrates, by a dashed line, the front glass 5 of the cabin 3 of the vehicle 1, the right and left front pillars 6 extending in the up-down direction on both right and left sides of the front glass 5, and a bulk structural member 7 extending in the vehicle width direction between the front glass 5 and the nose 4.

The vehicle external airbag 13 along with the inflator 12 is mounted on the central member 81 of the bulk structural member 7 in the vehicle width direction. The vehicle external airbag 13 is folded and stored on the inflator 12

As illustrated in the deployment state of FIG. 7, the vehicle external airbag 13 includes three bags: a central bag 31 that is to deploy in the center of the vehicle 1 in the vehicle width direction; a right bag 32 that is to deploy on the right side of the central bag 31; and a left bag 33 that is to deploy on the left side of the central bag 31.

The central bag 31 includes a central deployer 34, a right deployer 35, and a left deployer 36. The central deployer 34, the right deployer 35, and the left deployer 36 form one air chamber.

The inflator 12 is directly coupled to the central deployer 34. Upon being supplied with the high-pressure gas of the inflator 12, the central deployer 34 deploys at the central member 81 in the vehicle width direction into a substantially ellipsoidal elongated shape in the vehicle width direction with a large capacity. The central deployer 34 that is to deploy to a substantially ellipsoidal elongated shape in the vehicle width direction deploys to overlap a lower part of the front glass 5. In this manner, the central deployer 34 with a large capacity deploys to expand over the front glass 5 in the vehicle width direction, thus the head of a pedestrian or the like who is thrown over the nose 4 of the vehicle 1 is protected by the central deployer 34.

The right deployer 35 is provided on the right side of the central deployer 34 in the vehicle width direction of the vehicle 1. The right deployer 35 deploys on the right side of the central deployer 34. The right deployer 35 is longer than the central deployer 34 in the front-rear direction, and deploys rearward of the central deployer 34 in the vehicle 1.

The left deployer 36 is provided on the left side of the central deployer 34 in the vehicle width direction of the vehicle 1. The left deployer 36 deploys on the left side of the central deployer 34. The left deployer 36 is longer than the central deployer 34 in the front-rear direction, and deploys rearward of the central deployer 34 in the vehicle 1.

Thus, the central bag 31 is deployable into an external shape with ears standing on both right and left side parts so that both right and left side parts in the vehicle width direction extend rearward of the central part. The central bag 31 deploys to substantially cover a lower central part of the front glass 5.

The right bag 32 deploys on the right side of the central bag 31 into a substantially cylindrical elongated shape in the front-rear direction. On the right side of the right deployer 35 of the central bag 31, the right bag 32 deploys rearward of the right side of the central bag 31. The right bag 32 deploys to overlap substantially the entire right front pillar 6.

Figure 8:
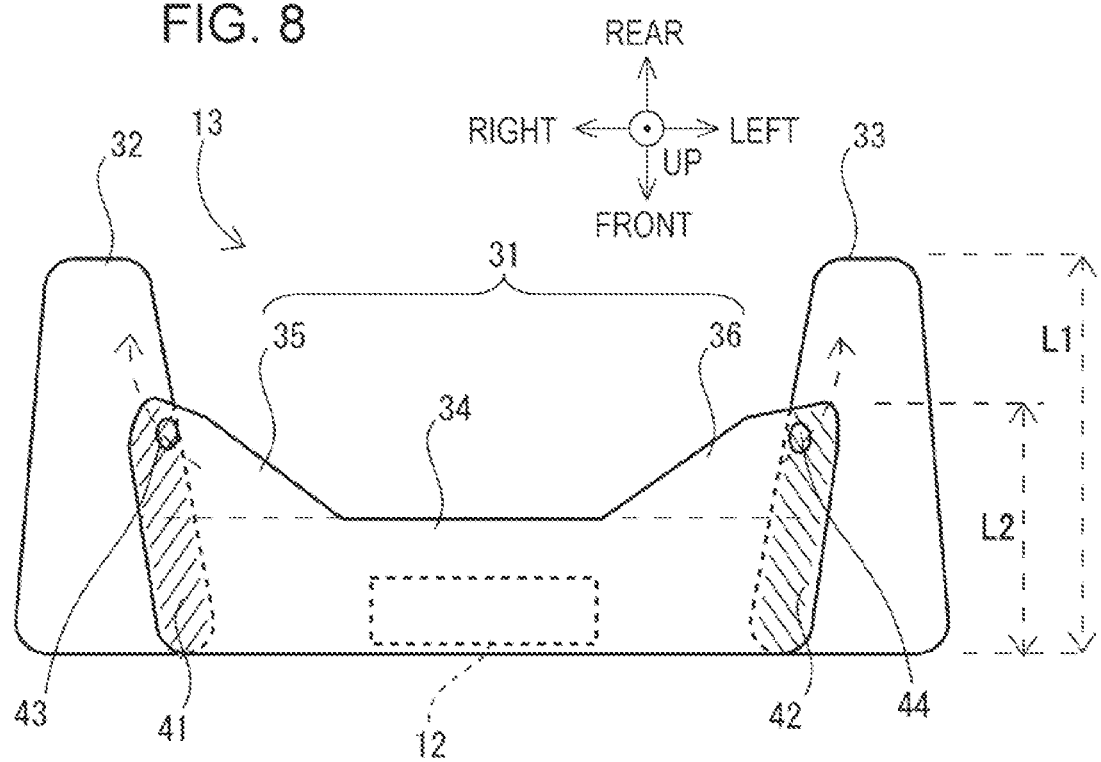
FIG. 8 is a schematic explanatory view of a detailed structure of the vehicle external airbag in FIG. 7.

Here, the right deployer 35 that deploys rearward on the right side of the central bag 31 is shorter than the right bag 32. As illustrated in FIG. 8 described later, length L2 of the right deployer 35 in the front-rear direction is approximately one half to two thirds of length L1 of the right bag 32 in the front-rear direction. Limiting the right deployer 35 to this length makes it difficult for part of the right deployer 35 to fluctuate during deployment of the central bag 31, the part projecting rearward of the central deployer 34. The right deployer 35 including the part projecting rearward is likely to deploy to the state of FIG. 7 along with the central deployer 34 without fluctuation.

The left bag 33 deploys on the left side of the central bag 31 into a substantially cylindrical elongated shape in the front-rear direction. On the left side of the left deployer 36 of the central bag 31, the left bag 33 deploys rearward of the left side of the central bag 31. The left bag 33 deploys to overlap substantially the entire left front pillar 6.

Here, the left deployer 36 that deploys rearward on the left side of the central bag 31 is shorter than the left bag 33. As illustrated in FIG. 8 described later, length L2 of the left deployer 36 in the front-rear direction is approximately one half to two thirds of length L1 of the left bag 33 in the front-rear direction. Limiting the left deployer 36 to this length makes it difficult for the left deployer 36 to fluctuate with respect to the central deployer 34 during deployment of the central bag 31. Limiting the left deployer 36 to this length makes it difficult for part of the left deployer 36 to fluctuate during deployment of the central bag 31, the part projecting rearward of the central deployer 34. The left deployer 36 including the part projecting rearward is likely to deploy to the state of FIG. 7 along with the central deployer 34 without fluctuation.

As in FIG. 7, due to deployment of the vehicle external airbag 13, a pedestrian who is thrown over the vehicle 1 is unlikely to be directly hit by the right and left front pillars 6 or the front glass 5. A pedestrian or the like who is thrown over the vehicle 1 can be favorably protected.

FIG. 8 is a schematic explanatory view of a detailed structure of the vehicle external airbag 13 in FIG. 7. In FIG. 8, the vehicle external airbag 13 does not deploy, and its entirety has a thin cloth bag shape.

The right bag 32 is joined to the right deployer 35 of the central bag 31. In FIG. 8, a right joint 41 that joins the right bag 32 and the right deployer 35 of the central bag 31 is substantially quadrilateral planar elongated shape in the front-rear direction of the vehicle 1. Here, part of the front side of the right bag 32 overlaps below the right deployer 35 of the central bag 31 in the up-down direction of the vehicle 1. The lower surface of the right deployer 35 of the central bag 31, and the upper surface of the right bag 32 are joined by the right joint 41. The right joint 41 may be implemented using adhesive agent used for the base cloth of a general airbag, or a method such as pressure bonding.

Since the right bag 32 overlaps below the right deployer 35 of the central bag 31 in this manner, the right deployer 35 of the central bag 31 which has deployed can achieve a function of suppressing the right bag 32 from above between the front glass 5 and the right deployer 35. During deployment, part of the right bag 32, provided with the right joint 41 can be suppressed from above by the right deployer 35 of the central bag 31. The right bag 32 is provided with the long joint in the front-rear direction between itself and the right deployer 35 which has deployed and started to achieve its strength, thus the right bag 32 is stably deployable in a posture extending in the front-rear direction.

The right joint 41 in substantially quadrilateral elongated shape in the front-rear direction of the vehicle 1 is provided with a first right communication hole 43 that allows the central bag 31 to communicate with the right bag 32. At the right joint 41 where the right bag 32 and the central bag 31 are joined, the first right communication hole 43 allows the central bag 31 to communicate with the right bag 32. In part of the right joint 41, the part being rearward of the position indicated by a dashed line in FIG. 8, the first right communication hole 43 allows the central bag 31 to communicate with the right bag 32. For example, in the present embodiment, at the rear end of the right joint 41, the first right communication hole 43 allows the central bag 31 to communicate with the right bag 32. The dashed line in FIG. 8 is obtained by extending the rear edge of the central deployer 34 of the central bag 31 in the vehicle width direction. After deployment of the central bag 31 progresses to some extent, and the rear end of the right deployer 35 starts to deploy, as indicated by an arrow dashed line in FIG. 8, the first right communication hole 43 provided at such a position starts to supply the high-pressure gas of the central bag 31 to the right bag 32. For example, when the central bag 31 is folded in the portion indicated by a dashed line in FIG. 8, the central bag 31 is unfolded from the front side to the rear in order and deployed, thus the start of supply of the high-pressure gas from the central bag 31 to the right bag 32 is delayed. The high-pressure gas of the inflator 12 can be supplied to the central bag 31 more preferentially than to the right bag 32.

The first right communication hole 43 like this is provided in the rear side of the right bag 32. Therefore, the right bag 32 deploys from the rear side to the front in order.

Note that the first right communication hole 43 may be a simple through-hole, but may be provided with a first right pressure reducing valve which is not illustrated. The first right pressure reducing valve serves to control pressure rise of the right bag 32 rather than that of the central bag 31, thus the high-pressure gas of the inflator 12 can be supplied to the central bag 31 more preferentially than to the right bag 32.

The left bag 33 is joined to the left deployer 36 of the central bag 31. In FIG. 8, a left joint 42 that joins the left bag 33 and the left deployer 36 of the central bag 31 is substantially quadrilateral planar elongated shape in the front-rear direction of the vehicle 1. Here, part of the front side of the left bag 33 overlaps below the left deployer 36 of the central bag 31 in the up-down direction of the vehicle 1. The lower surface of the left deployer 36 of the central bag 31, and the upper surface of the left bag 33 are joined by the left joint 42. The left joint 42 may be implemented using adhesive agent used for the base cloth of a general airbag, or a method such as pressure bonding.

Since the left bag 33 overlaps below the left deployer 36 of the central bag 31 in this manner, the left deployer 36 of the central bag 31 which has deployed can achieve a function of suppressing the left bag 33 from above between the front glass 5 and the left deployer 36. During deployment, part of the left bag 33, provided with the left joint 42 can be suppressed from above by the left deployer 36 of the central bag 31. The left bag 33 is provided with the long joint in the front-rear direction between itself and the left deployer 36 which has deployed and started to achieve its strength, thus the left bag 33 is stably deployable in a posture extending in the front-rear direction.

The left joint 42 in substantially quadrilateral elongated shape in the front-rear direction of the vehicle 1 is provided with a first left communication hole 44 that allows the central bag 31 to communicate with the left bag 33.

At the left joint 42 where the left bag 33 and the central bag 31 are joined, the first left communication hole 44 allows the central bag 31 to communicate with the left bag 33. In part of the left joint 42, the part being rearward of the position indicated by a dashed line in FIG. 8, the first left communication hole 44 allows the central bag 31 to communicate with the left bag 33. For example, in the present embodiment, at the rear end of the left joint 42, the first left communication hole 44 allows the central bag 31 to communicate with the left bag 33. After deployment of the central bag 31 progresses to some extent, and the rear end of the left deployer 36 starts to deploy, as indicated by an arrow dashed line in FIG. 8, the first left communication hole 44 provided at such a position starts to supply the high-pressure gas of the central bag 31 to the left bag 33. For example, when the central bag 31 is folded in the portion indicated by a dashed line in FIG. 8, the central bag 31 is unfolded from the front side to the rear in order and deployed, thus the start of supply of the high-pressure gas from the central bag 31 to the left bag 33 is delayed. The high-pressure gas of the inflator 12 can be supplied to the central bag 31 more preferentially than to the left bag 33.

The first left communication hole 44 like this is provided in the rear side of the left bag 33. Therefore, the left bag 33 deploys from the rear side to the front in order.

Note that the first left communication hole 44 may be a simple through-hole, but may be provided with a first left pressure reducing valve which is not illustrated. The first left pressure reducing valve serves to control pressure rise of the left bag 33 rather than that of the central bag 31, thus the high-pressure gas of the inflator 12 can be supplied to the central bag 31 more preferentially than to the left bag 33.

Next, the manner of deployment of the vehicle external airbag 13 illustrated in FIG. 7 and FIG. 8 will be described with reference to the schematic views in FIG. 9 to FIG. 16.

Note that the following description explains an example of a manner of favorable deployment of the vehicle external airbag 13. The vehicle external airbag 13 does not need to deploy strictly as described below.

FIG. 9 is an explanatory view schematically illustrating a storage state of the vehicle external airbag 13 in FIG. 7.

In FIG. 9, the vehicle external airbag 13 is stored in a central part of the bulk structural member 7. The central part of the bulk structural member 7 is proved with the inflator 12 between itself and the vehicle external airbag 13. In the storage state, the central bag 31 is folded. The right bag 32 is folded on the right side of the folded central bag 31. The left bag 33 is folded on the left side of the central bag 31. The vehicle external airbag 13 is stored compactly in the central part of the bulk structural member 7.

Figure 10:
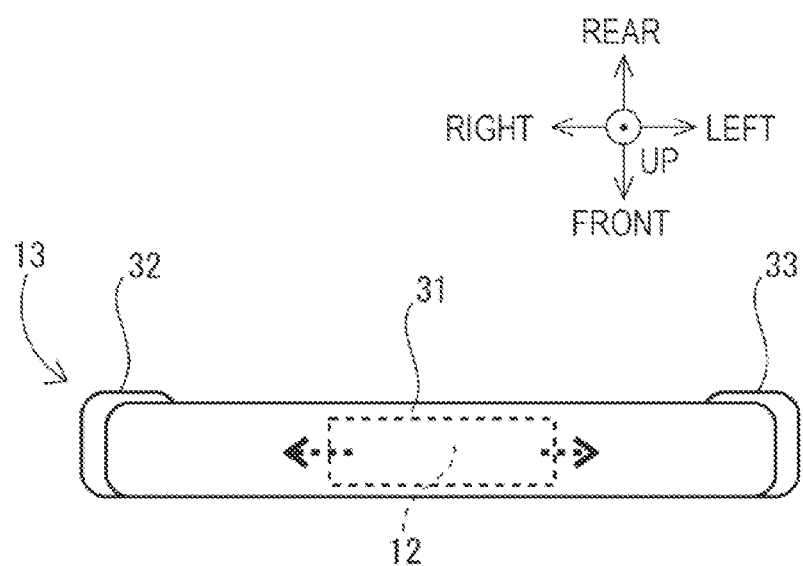
FIG. 10 is an explanatory view schematically illustrating the state immediately after the vehicle external airbag stored as in FIG. 9 starts to deploy.

FIG. 10 is an explanatory view schematically illustrating the state immediately after the vehicle external airbag 13 stored as in FIG. 9 starts to deploy.

When a pedestrian or the like is hit by the vehicle 1, the inflator 12 produces the high-pressure gas, and supplies the gas to the vehicle external airbag 13. The inflator 12 is coupled to the central deployer 34 of the central bag 31 of the vehicle external airbag 13. As indicated by a thick arrow line in FIG. 10, the inflator 12 may supply the high-pressure gas to the central bag 31 in the vehicle width direction. The inflator 12 may eject and supply the high-pressure gas to the right and left of the vehicle 1 in the vehicle width direction in the direction along the vehicle width of the vehicle 1 at the front side of the central bag 31 in the deployment state.

Thus, in the vehicle external airbag 13, at first, the central deployer 34 of the central bag 31 starts to deploy. The central deployer 34 of the central bag 31 starts to deploy to extend to the right and left in the vehicle width direction of the vehicle 1. The right deployer 35 and the left deployer 36 of the central bag 31 also start to deploy to extend to the right and left in the vehicle width direction of the vehicle 1. The central bag 31 is to deploy with the width illustrated in FIG. 7 and FIG. 8.

Figure 11:
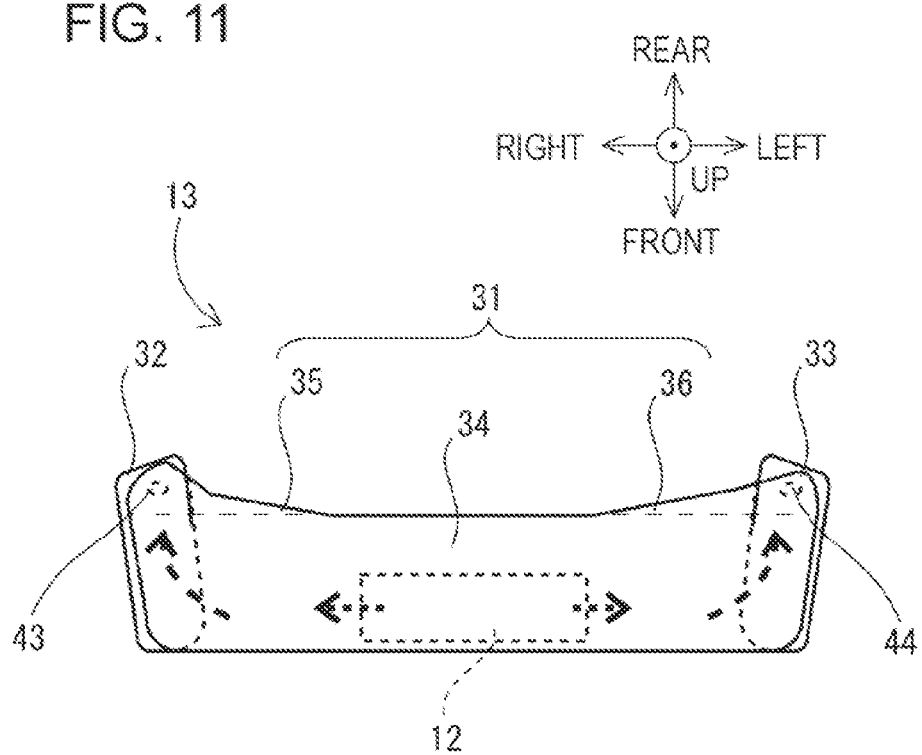
FIG. 11 is an explanatory view schematically illustrating a deployment state of the vehicle external airbag after FIG. 10.

FIG. 11 is an explanatory view schematically illustrating a deployment state of the vehicle external airbag 13 after FIG. 10.

When the deployment progresses from the state in FIG. 10, the vehicle external airbag 13, in which the central bag 31 is deploying in the vehicle width direction, starts to deploy in the rear direction. As indicated by a thick arrow line in FIG. 11, the high-pressure gas flows from the front to the rear along the right and left lateral surfaces of the central bag 31. Inflation of the central deployer 34 of the central bag 31 causes the first right communication hole 43 and the first left communication hole 44 provided rearward of the rear edge of the central deployer 34 to start to be exposed. Supply of the high-pressure gas from the central bag 31 to the right bag 32 and the left bag 33 can be started.

Figure 12:
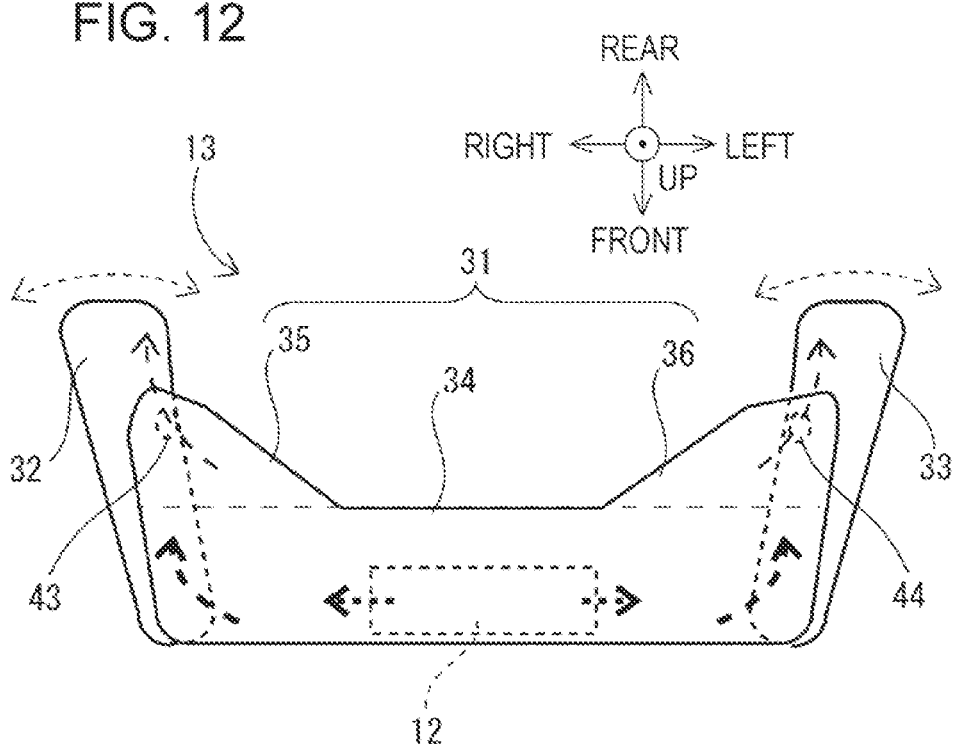
FIG. 12 is an explanatory view schematically illustrating a deployment state of the vehicle external airbag after FIG. 11.

FIG. 12 is an explanatory view schematically illustrating a deployment state of the vehicle external airbag 13 after FIG. 11.

In FIG. 12, the central bag 31 as well as the right deployer 35 and the left deployer 36 are in an overall substantially completed deployment state. The central bag 31 in a completed deployment state can achieve a certain stiffness due to the pressure of the high-pressure gas.

The high-pressure gas is supplied from the deploying central bag 31 to the right bag 32 through the first right communication hole 43. Since the first right communication hole 43 is provided in the rear side of the right deployer 35, and provided in the rear side of the right bag 32, the right bag 32 starts to deploy from the rear side. In this process, due to inflow of the high-pressure gas, the rear side of the right bag 32 immediately after the start of deployment is likely to fluctuate up, down, right, and left as illustrated by a dashed line arrow in FIG. 12. However, because the right bag 32 immediately after the start of deployment is joined to the right deployer 35 in an already deployed state via the right joint 41 having a length in the front-rear direction, the right bag 32 immediately after the start of deployment does not have overall significant fluctuation which may cause deviation to the outside over the right front pillar 6. The right bag 32 immediately after the start of deployment has a slightly fluctuating short part thereof rearward of the right deployer 35, while maintaining the position over the right front pillar 6.

The high-pressure gas is supplied to the left bag 33 from the deploying central bag 31 through the first left communication hole 44. Since the first left communication hole 44 is provided in the rear side of the left deployer 36, and provided in the rear side of the left bag 33, the left bag 33 starts to deploy from the rear side. In this process, due to inflow of the high-pressure gas, the rear side of the left bag 33 immediately after the start of deployment is likely to fluctuate up, down, right, and left as illustrated by a dashed line arrow in FIG. 12. However, because the left bag 33 immediately after the start of deployment is joined to the left deployer 36 in an already deployed state via the left joint 42 having a length in the front-rear direction, the left bag 33 immediately after the start of deployment does not have overall significant fluctuation which may cause deviation to the outside over the left front pillar 6. The left bag 33 immediately after the start of deployment has a slightly fluctuating short part thereof rearward of the left deployer 36, while maintaining the position over the left front pillar 6.

Figure 13:
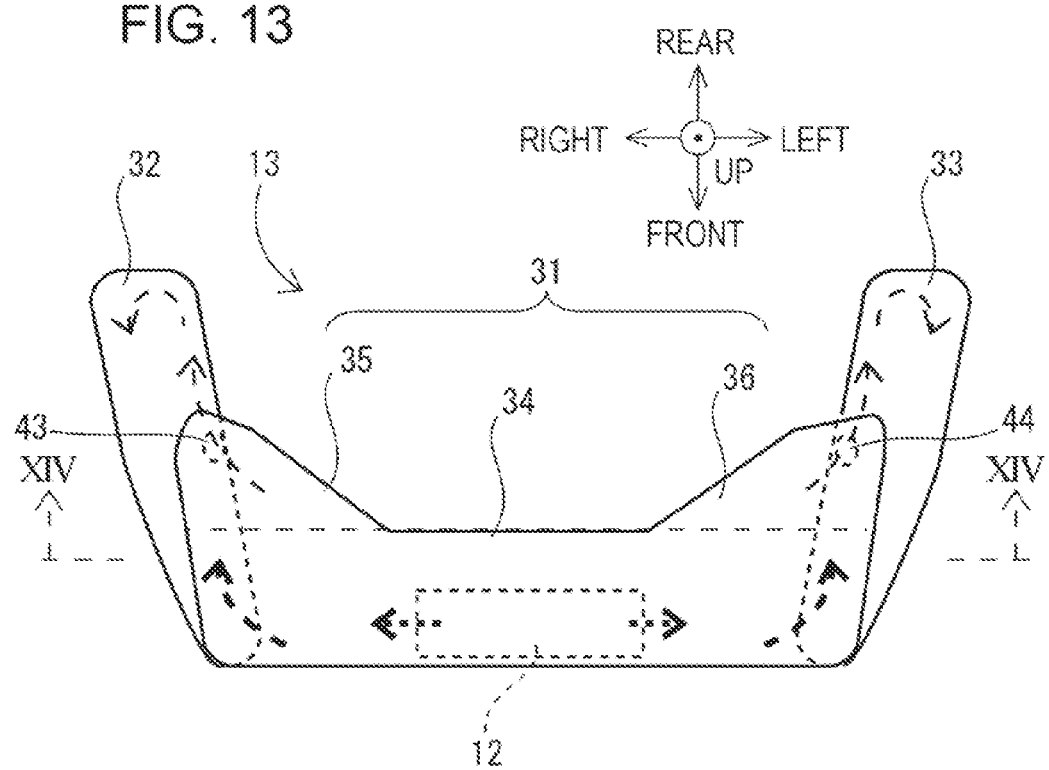
FIG. 13 is an explanatory view schematically illustrating a deployment state of the vehicle external airbag after FIG. 12.

FIG. 13 is an explanatory view schematically illustrating a deployment state of the vehicle external airbag 13 after FIG. 12.

Figure 14:
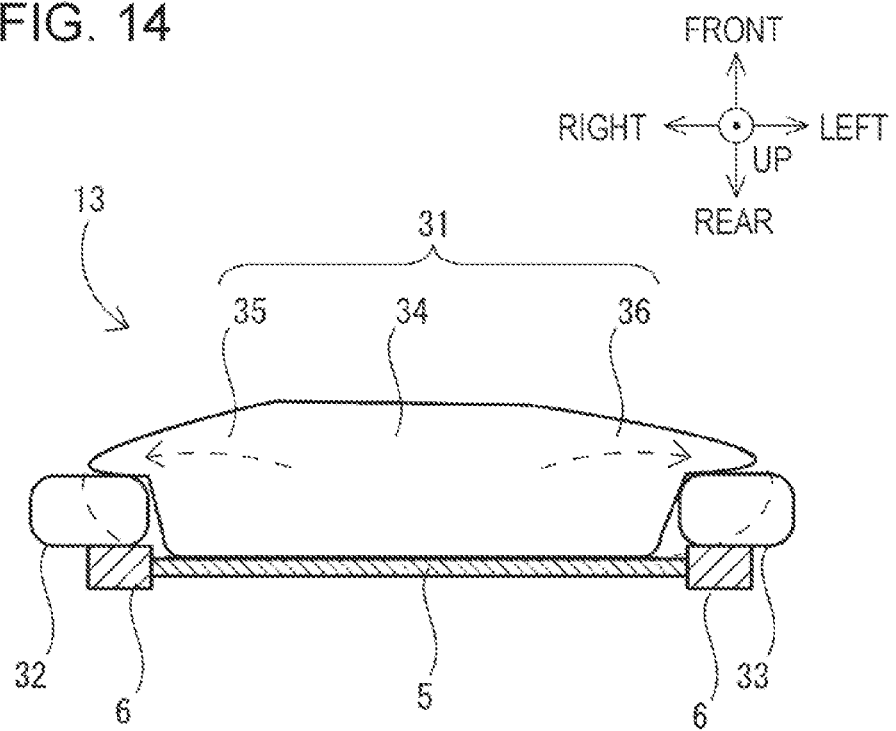
FIG. 14 is an explanatory view schematically illustrating XIV-XIV end face in FIG. 13.

FIG. 14 is an explanatory view schematically illustrating XIV-XIV end face in FIG. 13.

In FIG. 13, FIG. 14, the central bag 31 as well as the right deployer 35 and the left deployer 36 are in an overall substantially completed deployment state. The central bag 31 in a substantially completed deployment state can achieve a certain stiffness in the center of the vehicle 1 due to the pressure of the high-pressure gas.

The right bag 32, which has started to deploy from the rear side, starts to deploy forward as the deployment progresses. In the right bag 32, the high-pressure gas flows in the right side of the right joint 41, and deployment starts also in the front side of the right side of the right joint 41.

In this process, since the right bag 32 is joined to the right deployer 35 in an already deployed state via the right joint 41 which is long in the front-rear direction, the right bag 32 deploys in a stable posture on the right side of the right deployer 35. For example, as illustrated in FIG. 14, the right deployer 35 of the central bag 31 overlaps the right bag 32. The right deployer 35 of the central bag 31 in an already deployed state presses the right bag 32 during deployment from above against the front glass 5 and the right front pillar 6. Thus, as indicated by a dashed line in FIG. 14, the right bag 32 which deploys while partially denting the right deployer 35 of the central bag 31 further deploys in a stable posture on the right side of the right deployer 35.

Moreover, due to stable deployment of the front side of the right bag 32, the rear side of the right bag 32 is also stabilized because the front side and the rear side are united. In FIG. 12, even when part of the right bag 32 starts to fluctuate, the part being rearward of the right deployer 35, the fluctuation can be suppressed by starting the deployment of the front side of the right bag 32. In the course of deployment, the right bag 32 starts to deploy over the right front pillar 6 in an overall stable state without fluctuation.

The central bag 31 that is to preferentially deploy stabilizes the deployment of the right bag 32.

The left bag 33, which has started to deploy from the rear side, starts to deploy forward as the deployment progresses. In the left bag 33, the high-pressure gas flows in the left side of the left joint 42, and deployment starts also in the front side of the left side of the left joint 42.

In this process, since the left bag 33 is joined to the left deployer 36 in an already deployed state via the left joint 42 which is long in the front-rear direction, the left bag 33 deploys in a stable posture on the left side of the left deployer 36. For example, as illustrated in FIG. 14, the left deployer 36 of the central bag 31 overlaps the left bag 33. The left deployer 36 of the central bag 31 in an already deployed state presses the left bag 33 during deployment from above against the front glass 5 and the left front pillar 6. Thus, as indicated by a dashed line in FIG. 14, the left bag 33 which deploys while partially denting the left deployer 36 of the central bag 31 further deploys in a stable posture on the left side of the left deployer 36.

Moreover, due to stable deployment of the front side of the left bag 33, the rear side of the left bag 33 is also stabilized because the front side and the rear side are united. In FIG. 12, even when part of the left bag 33 starts to fluctuate, the part being rearward of the left deployer 36, the fluctuation can be suppressed by starting the deployment of the front side of the left bag 33. In the course of deployment, the left bag 33 starts to deploy over the left front pillar 6 in an overall stable state without fluctuation.

The central bag 31 that is to preferentially deploy stabilizes the deployment of the left bag 33.

For example, when the right bag 32 and the left bag 33 deploy from the front side to the rear side, at a later stage of the deployment, there is a high possibility that the rear side vibrates. In the present embodiment, deployment occurs from the front side to the rear side, thus at a later stage of the deployment, the rear side of the right bag 32 and the left bag 33 is unlikely to vibrate.

In the present embodiment, immediately after the start of deployment, the right bag 32 and the left bag 33 are stabilized in a state along the front pillars 6 of the vehicle 1, and deploy rearward of the central bag 31 in the vehicle 1 in the stable state. The right bag 32 and the left bag 33 are not affected by injection of the high-pressure gas thereinto, and deployment on the right and left of the central bag 31 in the vehicle width direction as the bags separated from the central bag 31, and are quickly deployable in a stable state.

In the present embodiment, the length of the right deployer 35 in the front-rear direction of the vehicle 1 is approximately one half to two thirds of the length of the right bag 32 in the front-rear direction of the vehicle 1, and is shorter than the right bag 32. In addition, the length of the left deployer 36 in the front-rear direction of the vehicle 1 is approximately one half to two thirds of the length of the left bag 33 in the front-rear direction of the vehicle 1, and is shorter than the left bag 33. Therefore, when the central bag 31 deploys, the right deployer 35 and the left deployer 36 of the central bag 31 are deployable rearward of the central bag 31 in a stable state with respect to the central deployer 34 of the central bag 31. The stable deployment of the right deployer 35 and the left deployer 36 causes the right bag 32 and the left bag 33 to be stabilized in a state along the front pillars 6 of the vehicle 1.

Moreover, in the present embodiment, the right bag 32 and the left bag 33 are separated from the central bag 31, and three bags are used as the vehicle external airbag 13. Thus, in the present embodiment, for example, as compared to when one bag to deploy is used in a range similar to the range of these bags as in FIG. 3, the part to deploy along the front pillars 6 of the vehicle 1 is unlikely to fluctuate. Moreover, when one bag is used as in FIG. 3, the bendable members 82 may deviate to the outside of the front pillars 6 due to inflow of the high-pressure gas. In the present embodiment, such deviation of the right bag 32 and the left bag 33 to the outside of the front pillars 6 is unlikely to occur.

In the present embodiment, the right bag 32 and the left bag 33 are separated from the central bag 31. Therefore, in the present embodiment, the total capacity can be reduced, for example, as compared to a large bag 84 that deploys to a large substantially quadrilateral shape in which deployment occurs including the space between the right bag 32 and the left bag 33 as in FIG. 4. In the present embodiment, the total capacity of the vehicle external airbag 13 can be reduced, and deployment of the vehicle external airbag 13 can be completed in a short time. In addition, the inflator 12 can also be downsized.

Figure 15:
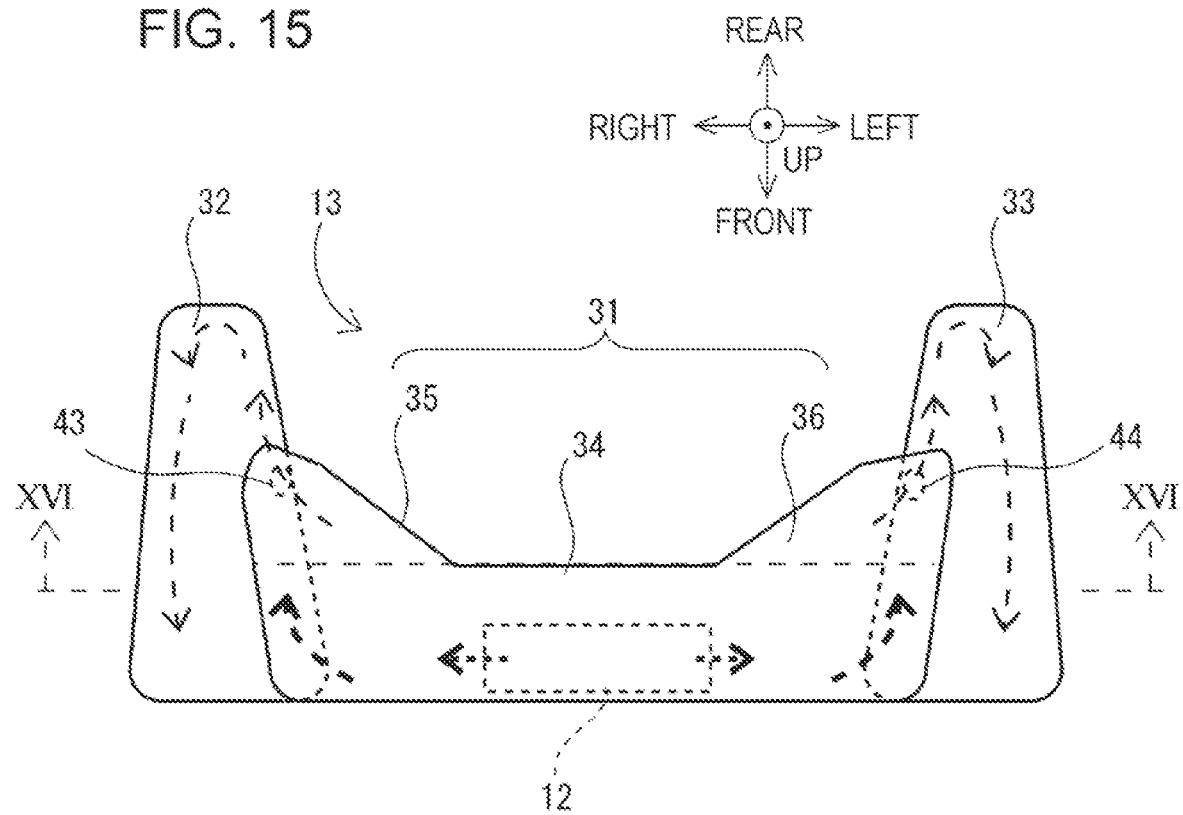
FIG. 15 is an explanatory view schematically illustrating a state where the vehicle external airbag fully deploys after FIG. 13.

FIG. 15 is an explanatory view schematically illustrating a state where the vehicle external airbag 13 fully deploys after FIG. 13.

Figure 16:
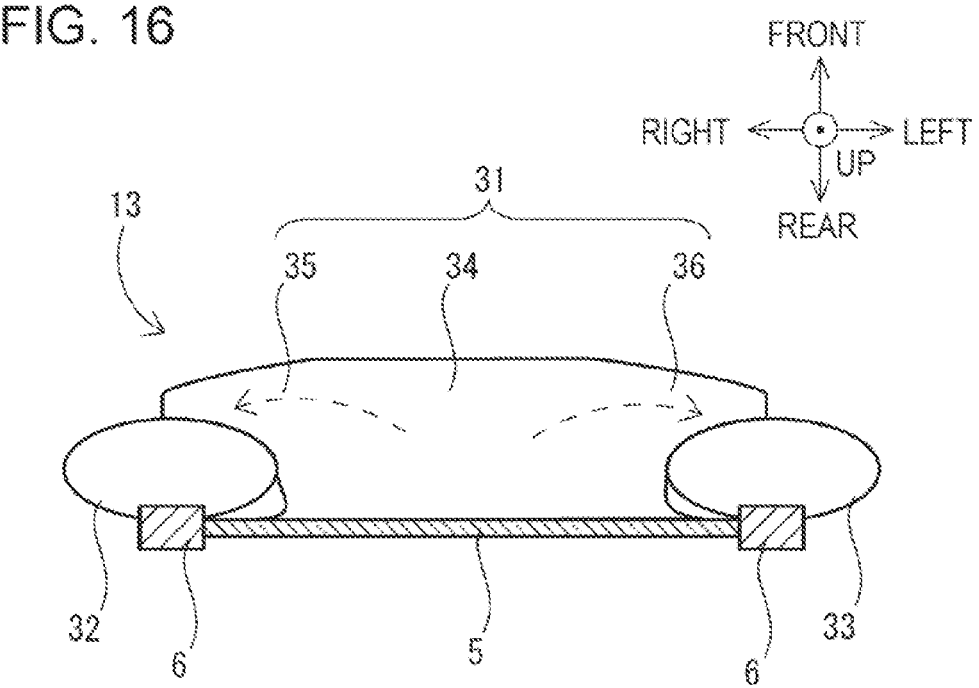
FIG. 16 is an explanatory view schematically illustrating XVI-XVI end face in FIG. 15.

FIG. 16 is an explanatory view schematically illustrating XVI-XVI end face in FIG. 15.

In FIG. 15, FIG. 16, the central bag 31 as well as the right deployer 35 and the left deployer 36 are in an overall substantially completed deployment state. The central bag 31 in a substantially completed deployment state can achieve a certain stiffness in the center of the vehicle 1 due to the pressure of the high-pressure gas.

The right bag 32 deploying forward from the rear side deploys to a desired shape on the right side of the right deployer 35 in an already deployed state as the deployment progresses.

In addition, the left bag 33 deploying forward from the rear side deploys to a desired shape on the left side of the left deployer 36 in an already deployed state as the deployment progresses.

Thus, the central bag 31, the right bag 32, and the left bag 33 of the vehicle external airbag 13 are deployable to respective desired shapes. The right bag 32 is deployable to overlap the right front pillar 6 without deviating to the right outer side from the right front pillar 6. The left bag 33 is deployable to overlap the left front pillar 6 without deviating to the left outer side from the left front pillar 6. The central bag 31 is deployable to a large substantially elliptical shape over the front side of the front glass 5. The vehicle external airbag 13 in such a deployment state can protect a pedestrian or the like who is thrown over the vehicle 1 as illustrated in FIG. 2 from being hit by the front glass 5 and the right and left front pillars 6. In the vehicle external airbag 13 of the present embodiment, deviation of the right bag 32 to the right outer side from the right front pillar 6, and deviation of the left bag 33 to the left outer side from the left front pillar 6 as in FIG. 3 are unlikely to occur.

As described above, the vehicle external airbag 13 in the present embodiment includes: the central bag 31 that is to deploy with large capacity and thickness in the central member 81 of the vehicle 1 in the vehicle width direction; and the right bag 32 and the left bag 33 that are provided on both right and left sides of the central bag 31 in the vehicle width direction of the vehicle 1, and configured to deploy rearward of the central bag 31 in the vehicle 1 along the right and left front pillars 6. The high-pressure gas supplied to the vehicle external airbag 13 by the inflator 12 is preferentially supplied to the central bag 31 rather than the right bag 32 and the left bag 33 at least at the start time of deployment.

Thus, in a state where the central bag 31 has already started to deploy over the front glass 5, the right bag 32 and the left bag 33 can start to deploy. The central bag 31 to be preferentially deployed is deployable over the front glass 5 to a desired shape by the pressure of the high-pressure gas before the deployment of the right bag 32 and the left bag 33 is completed. Therefore, the right bag 32 joined to the right side of the central bag 31 in the vehicle width direction of the vehicle 1 deploys rearward of the central bag 31 in the vehicle 1, and is deployable to overlap the front pillar 6 in a desired state on the right side of the front glass 5 in the vehicle width direction, while being supported by the central bag 31 which has deployed over the front glass 5 to a desired shape. In addition, the left bag 33 joined to the left side of the central bag 31 in the vehicle width direction of the vehicle 1 deploys rearward of the central bag 31 in the vehicle 1, and is deployable to overlap the front pillar 6 in a desired state on the left side of the front glass 5 in the vehicle width direction, while being supported by the central bag 31 which has deployed to a desired shape.

As a result, in the vehicle external airbag 13 including three bags: the central bag 31, the right bag 32 and the left bag 33, the right bag 32 and the left bag 33 are deployable to overlap the right and left front pillars 6 in a desired state. The right bag 32 and the left bag 33 are supported by the central bag 31 that is to preferentially deploy, and in a stable state, thus are stably deployable rearward of the central bag 31 in the vehicle 1 on both right and left sides of the deploying central bag 31 in the vehicle width direction of the vehicle 1. In the present embodiment, the right bag 32 and the left bag 33 of the vehicle external airbag 13 are likely to deploy to overlap the right and left front pillars 6 in a desired state. In the present embodiment, the vehicle external airbag device 10 provided in the vehicle 1 can be improved so that a pedestrian or the like who has collided with the vehicle 1 is unlikely to be directly hit by the right and left front pillars 6 of the vehicle 1.

The right bag 32 has a length to overall overlap the right front pillar 6 of the vehicle 1. The left bag 33 has a length to overall overlap the left front pillar 6 of the vehicle 1. Consequently, the right bag 32 and the left bag 33 can overall overlap the right and left front pillars 6 of the vehicle 1, thus can cover the entire right and left front pillars 6.

In the present embodiment, the central bag 31 further includes: a central deployer 34 that is to deploy to expand in the vehicle width direction of the vehicle 1; a right deployer 35 that is provided on the right side of the central deployer 34 in the vehicle width direction of the vehicle 1, and configured to deploy to extend rearward of the central deployer 34 in the vehicle 1; and a left deployer 36 that is provided on the left side of the central deployer 34 in the vehicle width direction of the vehicle 1, and configured to deploy to extend rearward of the central deployer 34 in the vehicle 1. Here, the central deployer 34, the right deployer 35, and the left deployer 36 form one air chamber as the central bag 31. The inflator 12 is coupled to the central deployer 34 in the central bag 31 among the central bag 31, the right bag 32, and the left bag 33 which are included in the vehicle external airbag 13.

In this situation, the high-pressure gas supplied from the inflator 12 to the central deployer 34 expands from the central deployer 34 to the right deployer 35 and the left deployer 36. As a result, the central bag 31 is deployable to its deployment shape. The right bag 32 is joined to the right deployer 35 of the central bag 31 that is to deploy. The right joint 41 for the joining has a length in the front-rear direction of the vehicle 1. Therefore, the posture during deployment of the right bag 32 joined to the right deployer 35 having a length in the front-rear direction of the vehicle 1 can be stabilized with respect to the central bag 31 which achieves a stiffness due to the deployment. The left bag 33 is joined to the left deployer 36 of the central bag 31 that is to deploy. The left joint 42 for the joining has a length in the front-rear direction of the vehicle 1. Therefore, the posture during deployment of the left bag 33 joined to the left deployer 36 having a length in the front-rear direction of the vehicle 1 can be stabilized with respect to the central bag 31 which achieves a stiffness due to the deployment.

In the present embodiment, in the deploy central bag 31 that is to deploy, the right deployer 35 deploys rearward of the central deployer 34 in the vehicle 1, but deploys with a length shorter than the right bag 32. Therefore, during the deployment of the central bag 31, the rear side of the right deployer 35 is unlikely to fluctuate as the right bag 32 during the deployment. In the central bag 31 that is to deploy, the left deployer 36 deploys rearward of the central deployer 34 in the vehicle 1, but deploys with a length shorter than the left bag 33. Therefore, during the deployment of the central bag 31, the rear side of the left deployer 36 is unlikely to fluctuate as the left bag 33 during the deployment. The central bag 31 including the right deployer 35 and the left deployer 36 which deploy rearward of the central deployer 34 in the vehicle 1 is stably deployable so as not to fluctuate in its entirety.

Moreover, in the present embodiment, not only the right deployer 35 deploys rearward of the central deployer 34 in the vehicle 1, but also the right bag 32 is joined to the right deployer 35 of the central bag 31 by the right joint 41 having a length in the front-rear direction of the vehicle 1. In this manner, the right bag 32 joined to the right deployer 35 of the central bag 31 by the right joint 41 having a length in the front-rear direction of the vehicle 1 is supported by the right deployer 35 of the preferentially deploying central bag 31 so that the posture in the front-rear direction is stabilized, and the right bag 32 is further unlikely to fluctuate during the deployment. Not only the left deployer 36 deploys rearward of the central deployer 34 in the vehicle 1, but also the left bag 33 is joined to the left deployer 36 of the central bag 31 by the left joint 42 having a length in the front-rear direction of the vehicle 1. In this manner, the left bag 33 joined to the left deployer 36 of the central bag 31 by the left joint 42 having a length in the front-rear direction of the vehicle 1 is supported by the left deployer 36 of the preferentially deploying central bag 31 so that the posture in the front-rear direction is stabilized, and the left bag 33 is further unlikely to fluctuate during the deployment.

In this manner, in the present embodiment, the right bag 32 and the left bag 33 are unlikely to fluctuate during the deployment. For example, even if the rear end of the right bag 32 or the left bag 33 fluctuates during the deployment, the fluctuation can be quickly suppressed by the long right joint 41 to the long right deployer 35 or the long left joint 42 to the long left deployer 36.

In the present embodiment, the vehicle external airbag 13 includes the first right communication hole 43 that allows the central bag 31 to communicate with the right bag 32, and the first left communication hole 44 that allows the central bag 31 to communicate with the left bag 33. Consequently, the high-pressure gas is supplied to the right bag 32 and the left bag 33 through the central bag 31.

Moreover, the first right communication hole 43 allows the central bag 31 to communicate with the right bag 32 at rear side of the right joint 41 of the central bag 31, the rear side being rearward of the rear edge of the central deployer 34. In addition, the first left communication hole 44 allows the central bag 31 to communicate with the left bag 33 at rear side of the left joint 42 of the central bag 31, the rear side being rearward of the rear edge of the central deployer 34.

Furthermore, the first right communication hole 43 is provided with the first right pressure reducing valve that serves to control pressure rise of the right bag 32 rather than that of the central bag 31. The first left communication hole 44 is provided with the first left pressure reducing valve that serves to control pressure rise of the left bag 33 rather than that of the central bag 31.

Because of these features, in the present embodiment, the high-pressure gas supplied to the vehicle external airbag 13 by the inflator 12 is preferentially supplied to the central bag 31 rather than the right bag 32 and the left bag 33 at least at the start time of deployment.

Moreover, in the present embodiment, the high-pressure gas is supplied to the right bag 32 and the left bag 33 from the rear side. The right bag 32 and the left bag 33 start to deploy from rear side, and are deployable from the rear side to the front side.

In the present embodiment, in a deployed state of the right bag 32, on the right side of the right deployer 35 of the central bag 31, part of the front side of the right bag 32 overlaps below the right deployer 35 of the central bag 31 in the up-down direction of the vehicle 1. The right joint 41 is provided in the overlapping area. Thus, at least during the deployment, the right bag 32 can be suppressed from above by the right deployer 35 of the preferentially deploying central bag 31. Moreover, in the overlapping area, the right bag 32 is joined to the right deployer 35 of the central bag 31 with a length in the front-rear direction of the vehicle 1. Thus, even when the rear end of the right bag 32 fluctuates during deployment, the fluctuation can be quickly suppressed by suppressing the front side of the right bag 32 with the right deployer 35 of the preferentially deploying central bag 31.

In addition, in a deployed state of the left bag 33, on the left side of the left deployer 36 of the central bag 31, part of the front side of the left bag 33 overlaps below the left deployer 36 of the central bag 31 in the up-down direction of the vehicle 1. The left joint 42 is provided in the overlapping area. Thus, at least during the deployment, the left bag 33 can be suppressed from above by the left deployer 36 of the preferentially deploying central bag 31. Moreover, in the overlapping area, the left bag 33 is joined to the left deployer 36 of the central bag 31 with a length in the front-rear direction of the vehicle 1. Thus, even when the rear end of the left bag 33 fluctuates during deployment, the fluctuation can be quickly suppressed by suppressing the front side of the left bag 33 with the left deployer 36 of the preferentially deploying central bag 31.

In contrast, for example, when the right bag 32 and the left bag 33 deploy from the front side to the rear side, if the rear side fluctuates during the deployment, the fluctuation cannot be suppressed by the central bag 31. The fluctuation is to be settled naturally.

Second Embodiment

Next, a vehicle external airbag device 10 for the vehicle 1 according to a second embodiment of the disclosure will be described. In the present embodiment, the same symbol is used for the same components as in the above-described embodiment, and illustration and description are omitted. In the following description, some points of difference from the above-described embodiment will be described.

Figure 17:
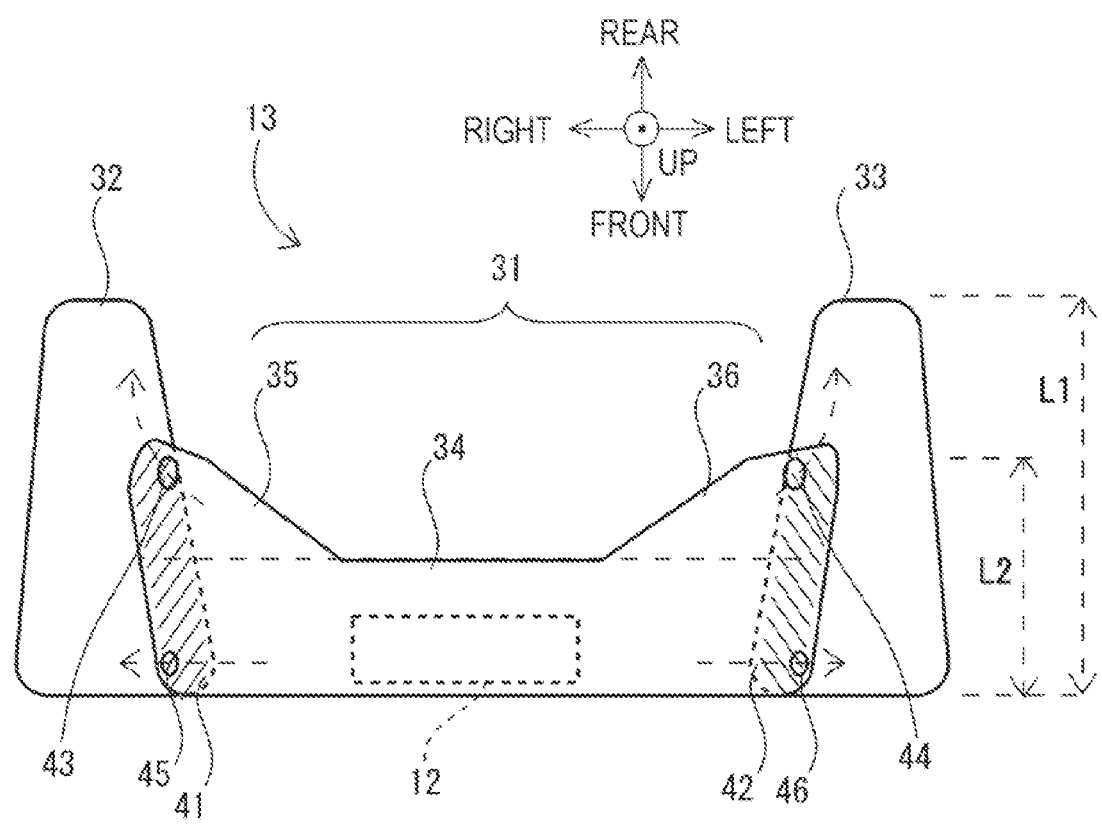
FIG. 17 is a schematic explanatory view of a detailed structure of a vehicle external airbag according to a second embodiment of the disclosure.

FIG. 17 is a schematic explanatory view of a detailed structure of a vehicle external airbag 13 according to a second embodiment of the disclosure.

The vehicle external airbag 13 in FIG. 17 includes a second right communication hole 45 that allows the central bag 31 to communicate with the right bag 32, and a second left communication hole 46 that allows the central bag 31 to communicate with the left bag 33.

In the right joint 41 where the right bag 32 and the central bag 31 are joined, the second right communication hole 45 allows the central bag 31 to communicate with the right bag 32. At front side of the right joint 41 in the deployment state of the central bag 31, the front side being forward of the position indicated by a dashed line in FIG. 17, the second right communication hole 45 allows the central bag 31 to communicate with the right bag 32. The dashed line in FIG. 17 is obtained by extending the rear edge of the central deployer 34 of the central bag 31 in the vehicle width direction. In a state where the central bag 31 deploys as in FIG. 2, as indicated by an arrow dashed line in FIG. 17, the second right communication hole 45 provided at such a position starts to supply the high-pressure gas of the central bag 31 to the right bag 32.

The second right communication hole 45 is basically smaller in diameter than the first right communication hole 43. The second right communication hole 45 may be provided with a second right reducing valve (not illustrated) through which it is more difficult to pass the high-pressure gas than through the first right reducing valve provided in the first right communication hole 43.

By providing the second right communication hole 45 like this, the start of supply of the high-pressure gas from the central bag 31 to the right bag 32 is made earlier than that in the above-described embodiment. Accordingly, the right bag 32 is deployable earlier. However, even in this situation, the high-pressure gas of the inflator 12 is still supplied to the central bag 31 more preferentially than the right bag 32.

At a later stage of the deployment of the vehicle external airbag 13, from the substantially deployed central bag 31 to the right bag 32 which has started to deploy, the high-pressure gas is likely to be directly supplied through the second right communication hole 45 with the momentum of the high-pressure gas of the inflator 12 without changing the direction. Therefore, the right bag 32 is likely to deploy resulting in a high internal pressure similar to the pressure of the central bag 31.

At the left joint 42 where the left bag 33 and the central bag 31 are joined, the second left communication hole 46 allows the central bag 31 to communicate with the left bag 33. At front side of the left joint 42 in the deployment state of the central bag 31, the front side being forward of the position indicated by a dashed line in FIG. 17, the second left communication hole 46 allows the central bag 31 to communicate with the left bag 33. In a state where the central bag 31 deploys as in FIG. 2, as indicated by an arrow dashed line in FIG. 17, the second left communication hole 46 provided at such a position starts to supply the high-pressure gas of the central bag 31 to the left bag 33.

The second left communication hole 46 is basically smaller in diameter than the first left communication hole 44. The second left communication hole 46 may be provided with a second left reducing valve (not illustrated) through which it is more difficult to pass the high-pressure gas than through the first left reducing valve provided in the first left communication hole 44.

By providing the second left communication hole 46 like this, the start of supply of the high-pressure gas from the central bag 31 to the right bag 32 is made earlier than that in the above-described embodiment. Accordingly, the left bag 33 is deployable earlier. However, even in this situation, the high-pressure gas of the inflator 12 is still supplied to the central bag 31 more preferentially than the right bag 32.

At a later stage of the deployment of the vehicle external airbag 13, from the substantially deployed central bag 31 to the left bag 33 which has started to deploy, the high-pressure gas is likely to be directly supplied through the second left communication hole 46 with the momentum of the high-pressure gas of the inflator 12 without changing the direction. Therefore, the left bag 33 is likely to deploy resulting in a high internal pressure similar to the pressure of the central bag 31.

As described above, in the present embodiment, the inflator 12 ejects and supplies the high-pressure gas to the right and left of the vehicle 1 in the vehicle width direction in the direction along the vehicle width of the vehicle 1 at the front side of the central bag 31 in the deployment state. In the present embodiment, as right communication holes to allow the central bag 31 to communicate with the right bag 32, the second right communication hole 45 is provided in addition to the first right communication hole 43 of the above-described embodiment. In the present embodiment, as left communication holes to allow the central bag 31 to communicate with the left bag 33, the second left communication hole 46 is provided in addition to the first left communication hole 44 of the above-described embodiment. At front side of the central bag 31 in the deployment state, the second right communication hole 45 and the second left communication hole 46 are provided in the ejection direction of the high-pressure gas from the inflator 12 to the central bag 31.

Moreover, in the present embodiment, the second right communication hole 45 may be smaller in diameter than the first right communication hole 43 to reduce the flow rate, and the second right communication hole 45 may be provided with a second right pressure reducing valve that, as compared to the first right reducing valve, serves to control pressure rise of the right bag 32 rather than that of the central bag 31. The second left communication hole 46 may be smaller in diameter than the first left communication hole 44 to reduce the flow rate, and the second left communication hole 46 may be provided with a second left pressure reducing valve that, as compared to the first left reducing valve, serves to control pressure rise of the left bag 33 rather than that of the central bag 31.

Thus, the high-pressure gas from the inflator 12 can directly flow into the right bag 32 and the left bag 33 through the second right communication hole 45 or the second left communication hole 46. Although the right bag 32 and the left bag 33 starts to deploy later than the central bag 31 starts, since the high-pressure gas from the inflator 12 can directly flow in through the second right communication hole 45 or the second left communication hole 46, deployment with the pressure equivalent to that of the central bag 31 easily occurs in the ultimate deployment state. The right bag 32 and the left bag 33 can deploy with the central bag 31 as one unit as if all bags belong to the same air chamber.

The above-described embodiments are examples of desirable embodiments of the disclosure, and the disclosure is not limited to those. Various modifications and changes may be made within a range not departing from the gist of the disclosure.

In the above-described embodiments, the vehicle external airbag 13 includes a pair of the right bag 32 and the left bag 33 along with the central bag 31.

In addition, for example, the vehicle external airbag 13 may include multiple bags in each of the right and left of the central bag 31. The right bag 32 or the left bag 33 may be divided into multiple parts in the front-rear direction or the vehicle width direction. Even in this situation, providing the high-pressure gas preferentially to the central bag 31 makes it easy for the bags on the right and left of the central bag 31 to deploy so as not to deviate to the outside from above of the right and left front pillars 6, and the vehicle external airbag 13 is likely to deploy to a desired state.

In the disclosure, the vehicle external airbag includes: a central bag (with large capacity and thickness) that is to deploy in the center of the vehicle in the vehicle width direction; and a right bag and a left bag that are provided on both right and left sides of the central bag in the vehicle width direction, the right bag and the left bag being configured to deploy to extend from the central bag rearward of the vehicle along the right and left front pillars of the vehicle. The high-pressure gas supplied to the vehicle external airbag by the inflator is supplied to the central bag more preferentially than to the right bag and the left bag at least at the start time of deployment. Thus, in a state where the central bag has already started to deploy over the front glass, the right bag and the left bag can start to deploy. Before the deployment of the right bag and the left bag is completed, the preferentially deployed central bag is deployable over the front glass to a desired shape by the pressure of the high-pressure gas. Therefore, the right bag joined to the right side of the central bag in the vehicle width direction of the vehicle deploys rearward of the central bag in the vehicle, and is deployable to overlap the front pillar in a desired state on the right side of the front glass in the vehicle width direction, while being supported by the central bag deploying over the front glass to a desired shape. In addition, the left bag joined to the left side of the central bag in the vehicle width direction of the vehicle deploys rearward of the central bag in the vehicle, and is deployable to overlap the front pillar in a desired state on the left side of the front glass in the vehicle width direction, while being supported by the central bag deploying over the front glass to a desired shape.

As a result, the vehicle external airbag including three bags, that is, the central bag, the right bag and the left bag is deployable so that the right bag and the left bag overlap the right and left front pillars in a desired state. The right bag and the left bag are supported by the central bag that is to preferentially deploy, and in a stable state, thus are stably deployable rearward of the central bag in the vehicle on both right and left sides of the deploying central bag in the vehicle width direction of the vehicle. In the disclosure, the right bag and the left bag of the vehicle external airbag are likely to deploy to overlap the right and left front pillars in a desired state. In the disclosure, the vehicle external airbag device provided in a vehicle can be improved so that a pedestrian or the like who has collided with a vehicle is unlikely to be directly hit by the right and left front pillars of the vehicle.

In this manner, the vehicle external airbag device provided in a vehicle can be improved in the disclosure.

The invention claimed is:

1. A vehicle external airbag device for a vehicle comprising a cabin, the vehicle external airbag device comprising a vehicle external airbag configured to, with supply of a high-pressure gas of an inflator, deploy, in the vehicle, rearward of the vehicle from between a nose in front of the cabin and a front glass of the cabin, so as to deploy over the front glass, the vehicle external airbag comprising:
a central bag configured to deploy in a center of the vehicle in a vehicle width direction of the vehicle;
a right bag joined to a right side of the central bag in the vehicle width direction, and configured to deploy to extend rearward of the central bag in the vehicle so as to overlap a front pillar on a right side of the front glass in the vehicle width direction; and
a left bag joined to a left side of the central bag in the vehicle width direction, and configured to deploy to extend rearward of the central bag in the vehicle so as to overlap a front pillar on a left side of the front glass in the vehicle width direction,
wherein the high-pressure gas supplied by the inflator to the vehicle external airbag is preferentially supplied to the central bag rather than the right bag and the left bag at least at a time when vehicle external airbag starts to deploy,
wherein the central bag has a bag with one air chamber including:
a central deployer coupled to the inflator, and configured to deploy to spread in the vehicle width direction with the supply of the high-pressure gas of the inflator;
a right deployer provided on a right side of the central deployer in the vehicle width direction, and configured to deploy rearward of the central deployer in the vehicle with a length shorter than the right bag; and
a left deployer provided on a left side of the central deployer in the vehicle width direction, and configured to deploy rearward of the central deployer in the vehicle with a length shorter than the left bag,
wherein the right bag is joined to the right deployer of the central bag by a right joint with a length in a front-rear direction of the vehicle,
wherein the left bag is joined to the left deployer of the central bag by a left joint with a length in the front-rear direction of the vehicle,
wherein the vehicle external airbag further comprises:
a first right communication hole allowing the central bag to communicate with the right bag; and
a first left communication hole allowing the central bag to communicate with the left bag,
wherein the first right communication hole is disposed in the right joint and disposed rearward of a rear edge of the central deployer, and
wherein the first left communication hole is disposed in the right joint and disposed rearward of the rear edge of the central deployer.

2. The vehicle external airbag device for the vehicle according to claim 1, wherein part of a front side of the right bag is configured to, when the right bag is in a deployed state, overlap a lower portion of the right deployer of the central bag in an up-down direction of the vehicle on a right side of the right deployer of the central bag, and the right joint is disposed at an area where the front side of the right bag is to overlap the lower portion of the right deployer, and
wherein part of a front side of the left bag is configured to, when the left bag is in a deployed state, overlap a lower portion of the left deployer of the central bag in the up-down direction of the vehicle on a left side of the left deployer of the central bag, and the left joint is disposed an area where the front side of the left bag is to overlap the lower portion of the left deployer.

3. The vehicle external airbag device for the vehicle according to claim 2,
wherein the inflator is configured to eject and supply the high-pressure gas to a front side of the central bag in a deployment state in a direction along the vehicle width direction of the vehicle, and
a second right communication hole that allows the central bag to communicate with the right bag, and a second left communication hole that allows the central bag to communicate with the left bag are provided on a front side of the central bag in a deployment state in an ejection direction of the high-pressure gas from the inflator to the central bag.

4. The vehicle external airbag device for the vehicle according to claim 1, wherein the left bag overlaps with the central bag in the vehicle width direction, and wherein the right bag overlaps with the central bag in the vehicle width direction.

5. The vehicle external airbag device for the vehicle according to claim 1, wherein a length of the right deployer in the front-rear direction is one half to two thirds of a length of the right bag in the front-rear direction, and wherein length of the left deployer in the front-rear direction is one half to two thirds of a length of the left bag in the front-rear direction.

6. The vehicle external airbag device for the vehicle according to claim 1, wherein the right bag deploys from the rear side to the front in order, and wherein the left bag deploys from the rear side to the front in order.

7. The vehicle external airbag device for the vehicle according to claim 1, wherein the first right communication hole includes a first right pressure reducing valve; and wherein the first left communication hole includes a first left pressure reducing valve.

\* \* \* \* \*